(12) United States Patent
Brunner

(10) Patent No.: US 10,793,172 B2
(45) Date of Patent: Oct. 6, 2020

(54) CONTAINER ASSEMBLY

(71) Applicant: KETER PLASTIC LTD., Herzliya (IL)

(72) Inventor: Yaron Brunner, Kibbutz Gvat (IL)

(73) Assignee: KETER PLASTIC LTD., Herzliya (IL)

( * ) Notice: Subject to any disclaimer, the term of this patent is extended or adjusted under 35 U.S.C. 154(b) by 0 days.

(21) Appl. No.: 15/781,658

(22) PCT Filed: Dec. 8, 2016

(86) PCT No.: PCT/IL2016/051315
§ 371 (c)(1),
(2) Date: Jun. 5, 2018

(87) PCT Pub. No.: WO2017/098513
PCT Pub. Date: Jun. 15, 2017

(65) Prior Publication Data
US 2019/0002004 A1    Jan. 3, 2019

Related U.S. Application Data

(60) Provisional application No. 62/265,507, filed on Dec. 10, 2015, provisional application No. 62/302,235, filed on Mar. 2, 2016.

(51) Int. Cl.
| | | |
|---|---|---|
| *B62B 1/00* | (2006.01) |
| *B65D 21/032* | (2006.01) |
| *B25H 3/02* | (2006.01) |
| *B65D 21/02* | (2006.01) |
| *B65D 21/00* | (2006.01) |
| *B62B 1/20* | (2006.01) |
| *B62B 5/06* | (2006.01) |

(52) U.S. Cl.
CPC .............. *B62B 1/006* (2013.01); *B25H 3/02* (2013.01); *B25H 3/023* (2013.01); *B25H 3/026* (2013.01); *B62B 1/20* (2013.01); *B62B 5/067* (2013.01); *B65D 21/00* (2013.01); *B65D 21/0212* (2013.01); *B62B 2202/48* (2013.01)

(58) Field of Classification Search
CPC .......... B25H 3/02; B25H 3/023; B25H 3/026; B65D 21/0212; B65D 21/0213; B65D 21/0222; B65D 21/0228; B65D 21/00; B65D 2501/24624; B65D 2501/2463; B65D 2501/24643; B62B 1/006; B62B 1/20; E05C 1/10
See application file for complete search history.

(56) References Cited

U.S. PATENT DOCUMENTS 4,619,363 A * 10/1986 Wolfseder .......... B65D 21/0224
                                                            206/372
4,974,740 A   12/1990 Niles et al.
(Continued)

FOREIGN PATENT DOCUMENTS

DE    93 13 802 U1    12/1993
DE    44 15 638 C2     7/2002
(Continued)

*Primary Examiner* — Steve Clemmons
(74) *Attorney, Agent, or Firm* — Vorys, Sater, Seymour and Pease LLP; Anthony P. Venturino

(57) ABSTRACT

Provided are container assemblies, including at least two containers detachably attached to one another by locking arrangements.

16 Claims, 32 Drawing Sheets

(56) References Cited

U.S. PATENT DOCUMENTS

| | | | |
|---|---|---|---|
| 6,176,559 B1 * | 1/2001 | Tiramani | B25H 3/023 280/47.19 |
| 6,371,320 B2 | 4/2002 | Sagol | |
| 6,874,634 B2 * | 4/2005 | Riley | A61L 2/26 206/370 |
| 6,889,838 B2 * | 5/2005 | Meier | B25H 3/021 206/508 |
| 6,951,118 B2 * | 10/2005 | Brennan | F25D 23/062 62/326 |
| 7,156,249 B2 | 1/2007 | Heinrichs | |
| 7,503,569 B2 * | 3/2009 | Duvigneau | A45C 7/0045 190/110 |
| 7,753,222 B1 | 7/2010 | Heinrichs | |
| 8,206,058 B2 | 6/2012 | Vrondran et al. | |
| 8,567,631 B2 * | 10/2013 | Brunner | B25H 3/02 220/326 |
| D702,044 S * | 4/2014 | Shitrit | D3/281 |
| 8,979,100 B2 * | 3/2015 | Bensman | B62B 5/00 280/47.26 |
| 9,132,543 B2 * | 9/2015 | Bar-Erez | B25H 3/023 |
| 9,145,230 B2 * | 9/2015 | Madsen | B65D 21/0212 |
| 9,193,060 B2 * | 11/2015 | Ben-Gigi | B25H 3/026 |
| 9,393,684 B2 * | 7/2016 | Christopher | B25H 3/02 |
| 9,393,685 B2 * | 7/2016 | Chen | B25H 3/02 |
| 9,469,024 B2 * | 10/2016 | Bensman | B25H 3/023 |
| RE47,022 E * | 9/2018 | Sosnovsky | B25H 3/02 |
| 2010/0052276 A1 | 3/2010 | Brunner | |
| 2011/0139665 A1 * | 6/2011 | Madsen | B25H 3/026 206/508 |
| 2012/0312812 A1 | 12/2012 | Sosnovsky et al. | |
| 2012/0326406 A1 * | 12/2012 | Lifshitz | B25H 3/02 280/47.19 |
| 2013/0320006 A1 * | 12/2013 | Orgeldinger | B65D 1/243 220/4.33 |

FOREIGN PATENT DOCUMENTS

| | | | | |
|---|---|---|---|---|
| DE | 20 2012 102 760 U1 | 1/2013 | | |
| EP | 0 348 787 A2 | 1/1990 | | |
| EP | 1 516 703 A1 | 3/2005 | | |
| EP | 2 226 163 A2 | 9/2010 | | |
| EP | 2402259 A1 * | 1/2012 | | B65D 21/0228 |
| EP | 2 537 641 A2 | 12/2012 | | |
| GB | 2242475 A * | 10/1991 | | E05C 1/10 |
| WO | 2008/090546 A1 | 7/2008 | | |
| WO | 2014/102783 A1 | 7/2014 | | |

* cited by examiner

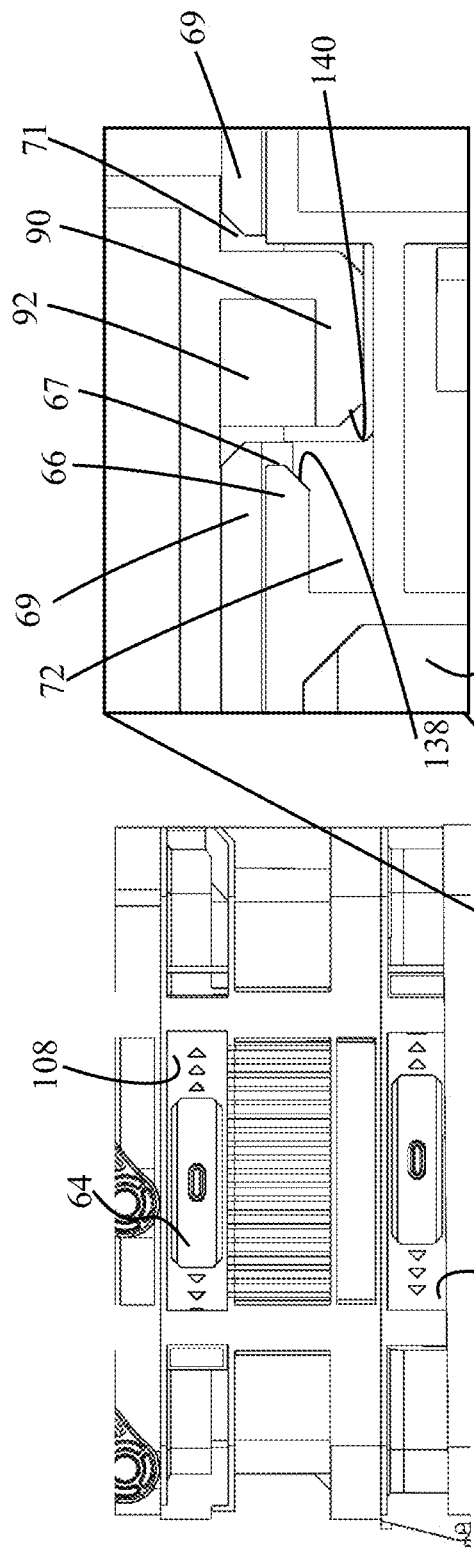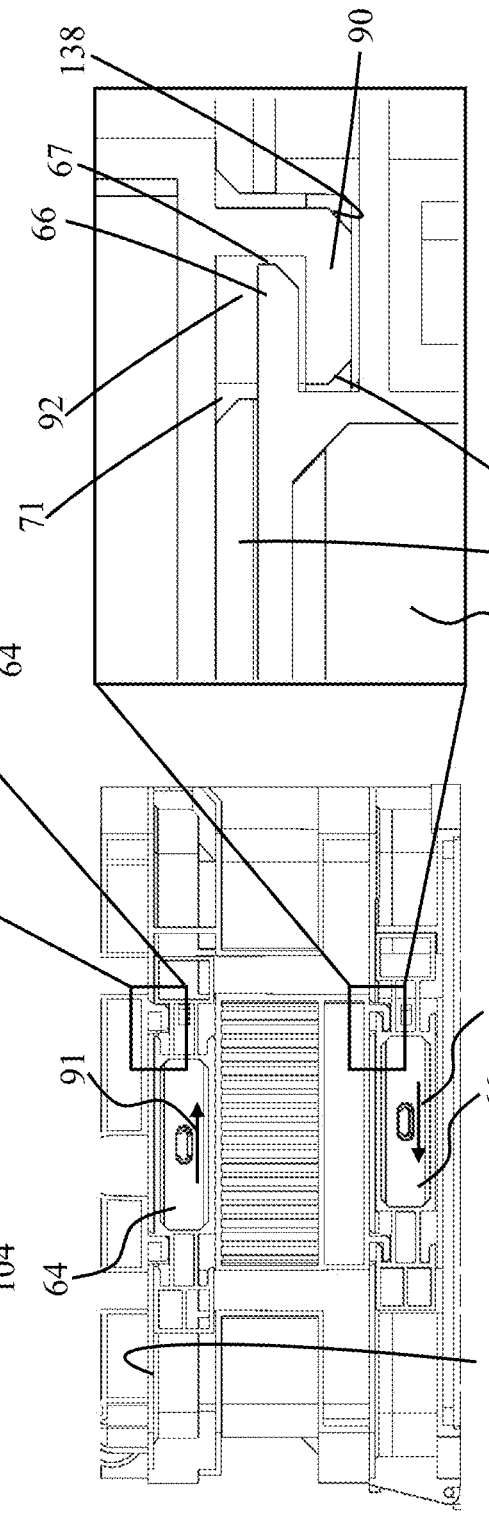

CONTAINER ASSEMBLY

TECHNOLOGICAL FIELD

The present disclosure is generally in the field of multi-container assemblies. More specifically the disclosure is directed to a locking system for detachably attaching containers to one another.

The term multi-container assembly as used herein denotes any set of containers configured for articulation to one another, the assembly being either stationary or locomotive. Said assembly can be used as a tool cart, workshop, traveling luggage, etc.

The term container as used herein denotes any type of container, used as a tool caddy, organizer, traveler bag, cosmetics bag, storage containers, locomoting containers, etc.

GENERAL DESCRIPTION

According to the present disclosure there is a container assembly comprising at least one first container and at least one second container, each of which is configured with a top base portion and a bottom base portion, wherein a top base portion of a first container is configured for at least partially nesting a bottom base portion of a second container, and wherein the first container is configured at a top portion thereof with a locking arrangement configured for locking engagement with a bottom portion of the second container nested within the top base portion.

According to a first aspect of the present disclosure the locking arrangement is a sliding locking mechanism, and according to a second aspect of the disclosure the locking mechanism is a snap-type latch mechanism.

According to the first aspect of the present disclosure there is provided a container assembly comprising at least one first container and at least one second container, detachably attachable to one another by a sliding locking mechanism. The sliding locking mechanism interacts between the at least one first container and at least one second container, wherein the at least one first container is configured at a top portion thereof with a first locking member and the at least one second container is configured at a bottom portion thereof with a second locking member, such that when the second container rests over the first container said first locking member and said second locking member are aligned and are configured for locking by interaction one with the other.

A bottom most container of the container (also referred to herein as a base container) assembly serves as a first container, wherein a container mounted over said base container is a second container. The arrangement is such that the container assembly can comprise additional containers, wherein each second container can be configured with a second locking member at a bottom portion of the container and with a first locking member at a top portion of the container, whereby the additional containers can be mounted over one another and locked to each other. In other words, the containers assembly may comprise a first container, serving as a base container, onto which at least one second container is mounted, such that each second container is configured with both a first locking member at a top portion and a second locking member at a bottom portion thereof.

When the containers assembly includes only two containers, the second container typically is configured with a second locking member at its bottom portion, and optionally with a first locking member at its top portion.

The sliding locking mechanism comprises a sliding unit, that comprises a slider member and at least one arresting member, the sliding unit being configured at one of the first container and the second container, and constitutes one of said first locking member and said second locking member. The sliding locking mechanism further comprises a corresponding at least one static locking element configured at the other of the first container and the second container and constituting the other one of said first locking member and said second locking member.

The sliding unit is slidingly displaceable between a locked position, in which the at least one arresting member arrests the corresponding static locking element, thereby locking the second container in position above the first container; and an unlocked position, wherein the arresting member is disengaged from the corresponding static locking element whereby the second container can be removed from the first container.

According to a particular example, the container assembly comprises a first, base container configured at a top portion thereof with said sliding unit, and a second container configured at a bottom portion thereof with said corresponding static locking element, whereby upon placing the second container over the first container the slider unit can be displaced into locking, thus arresting said static locking element.

Any one or more of the following features, designs and configurations, can be implemented in a multi-container assembly of the first aspect, according to the present disclosure, individually or in various combinations thereof:

- The container assembly may be modular, such that a bottom of any second container can be mounted over a top of any first container.
- A bottom-most container in a container assembly is a base container.
- The container assembly can be configured as a portable container assembly, wherein the base container can be fitted with a locomoting arrangement. According to one particular arrangement, the base container is wheeled.
- A top-most container, which serves as a second container, can be configured with only a bottom portion configured for mounting over a first container disposed therebelow, e.g. such a top-most container can be devoid of said second locking member. An example of such a container is a soft carry container.
- The first locking member and the second locking member can be interchangeable, i.e. the first locking member and the second locking member can be configured at either a top portion or a bottom portion of a respective container.
- The sliding locking mechanism can be configured with a visible indication indicating a 'locked' or 'unlocked' position thereof. The visible indication can be associated independently with each locking mechanism.
- The slider member of the sliding unit can be configured with a finger grip.
- The slider member of the sliding unit can snapingly displace between the respective locked/unlocked position.
- The slider member may be spontaneously displaceable into arresting the static locking element, whereby one or both of the arresting element of the sliding unit and the respective static locking element can be configured with a chamfered gliding surface, whereby positioning of the second container over the first container results in spontaneous displacement of the slider member into arresting the static locking element.

The slider unit may be configured with a biasing mechanism for biasing the slider member into the locked position.

The container assembly may be configured with an anti-unlocking rod for simultaneously arresting sliding locking mechanisms of all respective containers at a locked position. The anti-unlocking rod can be locked at an anti-unlocking position.

The first locking member and the second locking member substantially do not project beyond or below a respective top most edge and a bottom most edge of the respective first container and second container.

The containers of a container assembly may be configured with at least two sliding locking mechanism disposed at opposite side faces of each container.

According to the second aspect of the disclosure, the container assembly comprises a locking arrangement that comprises at least one locking member and a locking receptacle. At least one side wall of the first container comprises said at least one locking member pivotally secured at a top portion of the first container, and said locking receptacle is configured at a base portion of the second container, said locking member configured with at least one locking latch configured for locking engagement within said locking receptacle; the locking member being pivotally displaceable between a locked position in which the at least one locking latch is radially engaged within the locking receptacle, such that the second container is lockingly articulated over the first container, and an unlocked position in which the locking member is outwardly pivoted and the at least one locking latch is disengaged from the locking receptacle such that the second container can be separated from the first container.

It is appreciated the term 'first container' and 'second container' denote the order of containers mounted over each other, whilst in fact a like container can constitute a first container and a second container. Accordingly, a container assembly according to the present disclosure may comprise two containers, wherein the bottom most container is a so-called first container, and a container mounted over said base container is thus a so-called second container. However, when a container assembly comprises three or more containers, a bottom-most container is a so-called first container, and a container mounted over said base container is a so-called second container, whilst said second container becomes a 'first container' when addressing the relation with a third container mounted thereover—in such a case the second container will be referred to as a 'first container' and the third container bearing thereover will in turn be referred to as a 'second container'.

According to a particular configuration of the disclosure, the first, bottom most container is a base container, configured with locomoting mechanism, e.g. a wheeling system, and a manipulating arrangement, e.g. a telescopic handle extending therefrom.

According to another aspect there is provided a container comprising at least one of a locking receptacle configured at the base portion of the container, and at least one locking member configured with at least one locking latch and being pivotally secured at the top portion of the container, the locking member being pivotally displaceable between a locked position at which the at least one locking latch radially inwardly projects into a top base portion of the container, and an unlocked position in which the locking member is outwardly pivoted.

The container is configured for use in conjunction with a container assembly as disclosed herein.

Any one or more of the following features, designs and configurations, can be implemented in a multi-container assembly of the second aspect, according to the present disclosure, individually or in various combinations thereof:

The locking member may be pivotally displaceable between its unlocked position and its locked position about an axis extending substantially parallel to a the top base portion of the container;

The first container can be configured with a support rim constituting a nesting portion, at least partially circumferencing the top base portion thereof, and wherein at the locked position the at least one locking latch radially projects inwardly from said rim;

The support rim can be configured with one or more latch passages, each slidingly accommodating a locking latch of the locking member;

The one or more locking latch of the locking member extends below a top surface of the support rim, whereby it is protected;

At an assembled position, a base portion of the first container is at least partially nested within the support rim of the first container;

The second container can be configured at the bottom base portion thereof with a nestable portion, shaped and sized for at least partial nesting within boundaries of the support rim of the first container;

The second container can be configured at the bottom base portion thereof with a seat portion at least partially circumferencing the nestable portion; said seat portion configured for bearing over a top surface of the support rim of the second container;

One or both of the nestable portion and the support rim can be configured with a chamfered gliding surface for easy positioning the nestable portion within the nesting portion;

The locking receptacle of the second container is configured at the seat portion and has an opening on a face of said seat portion, said opening disposed in alignment with a respective latch of the locking member;

Any container can be a bucket-like container configured with a top opening, or a container configured with a closable lid (e.g. a pivotable lid), or the container can have a fixed top cover, configured with side openings;

A container can be a tactic unit, such as power unit, power tool, support structure, etc., and configured with at least one of a locking receptacle configured at the base portion of the container, and at least one locking member configured with at least one locking latch and being pivotally secured at the top portion of the container, the locking member being pivotally displaceable between a locked position at which the at least one locking latch radially inwardly projects into a top base portion of the container, and an unlocked position in which the locking member is outwardly pivoted; said container configured for interlocking stacking with on top or below a like container;

The locking member can be configured with several locking latches;

The locking member can serve as a carrying handle, at either the locked position and the unlocked position; whereby the carrying handle is configured with an gripping portion;

The gripping portion of the handle can extend within a recess configured within a side wall of the container, giving rise to a griping space facilitating an individual to insert his fingers for gripping said gripping portion;

The locking arrangement can be configured with an arresting arrangement for arresting the locking member at least at the locked position, regardless if a second container is mounted thereover;

The arresting arrangement can be a snap-type arrangement, wherein one of the at least one locking latch and a top portion of the container is configured with a projection and the other of the at least one locking latch and a top portion of the container is configured with a recess, wherein the locking member is snapingly displaceable at least into the locked position;

The locking member can be pivotally restricted between the locked position and the unlocked position; pivotal restriction can be facilitated by a restricting projection is configured to prevent the locking latch from disengaging from the supporting rim;

One or both of the one or more locking member and the latch passages can be configured with bulges for substantially reducing or eliminating slack of the locking member and friction arresting thereof;

One or more of the bulges can protrude into a respective depression for snapingly arresting of the locking member;

The locking arrangement can be configured such that in the event that a second container is placed over a first container, when the locking member of the first container is at the locked position, positioning the second container over the first container entails spontaneous displacement of the locking member into the unlocked position;

The locking arrangement is such that when a second container is placed over a first container and the locking mechanism is at the respective locked position, loads applied to the carrying handle are substantially not applied to the locking latches;

The arrangement is such that the one or more locking latches of a locking mechanism displace through the latch passage between a locked position in which the locking latches project inwards from the support rim, configured to engage with a respective locking receptacle of the second container, and an unlocked position in which the locking latches are retracted in an outward direction, such that they substantially do not project inwards from the support rim, and thus are disengaged from the locking receptacle of the second container;

According to a particular configuration, the container is rectangular and at least two opposite side walls are each configured with a locking mechanism.

Any one or more of the following features, designs and configurations, can be implemented in any of the aspects described herein, individually or in various combinations thereof:

The containers of the container assembly are interchangeable, wherein each container, apart for a wheeled container (i.e. the base container), can be mounted over each of the other containers, i.e. the container assemblage can be modular.

The containers of the container assembly can comprise one or more bucket-like containers, one or more drawer containers configured with a drawer-housing container, one or more organizer containers configured with an organizer container.

The containers of the container assembly can comprise one or more sliding containers. The sliding container comprising two sub-containers that are slidingly associated one with the other.

The containers of the container assembly can comprise one or more pivoting container. The pivoting container being pivotably associated with the first container or any of the second containers.

The containers of the container assembly can comprise one or more parallel mechanism containers, such that a sliding movement of one container with respect to the another container brings one of the containers into a parallel position with respect to the other container.

The container assembly can be configured with a handle. The handle can be fixed or detachable. The handle can be articulated to a base container and/or to any other container in the assembly.

The containers of the container assembly may be stackable over one another or partially nested one within the other.

The second container may be arrested over the first containers at either front orientation or back orientation, i.e. rotated at 180° about a longitudinal axis extending through the containers.

One or more of the containers of the container assembly may be detached and used as carry along, independent container.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 6A is a planar view illustrating a portion of a container assembly, with two locking mechanisms, at a locked position and at an unlocked position;

FIG. 6B is a schematic representation of FIG. 6A, exposing the locking arrangement;

FIG. 6C is an enlargement of the locking arrangement of FIG. 6B at the unlocked position;

FIG. 6D is an enlargement of the locking arrangement of FIG. 6B at the locked position;

DETAILED DESCRIPTION OF EMBODIMENTS

Figure 1A:
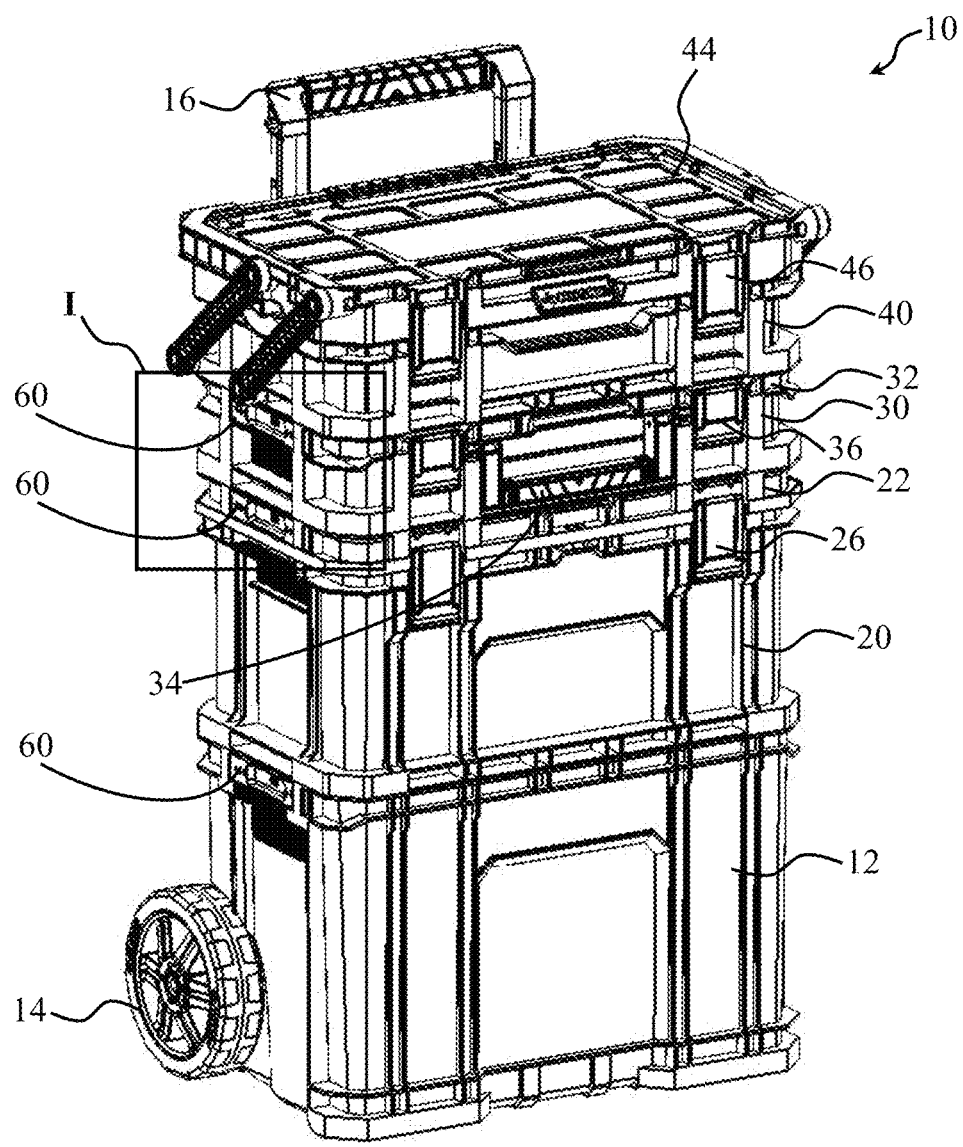
FIG. 1A is a top, front left perspective view of a container assembly according to an example of the present disclosure, the locking arrangement at their locked position.
Figure 1B:
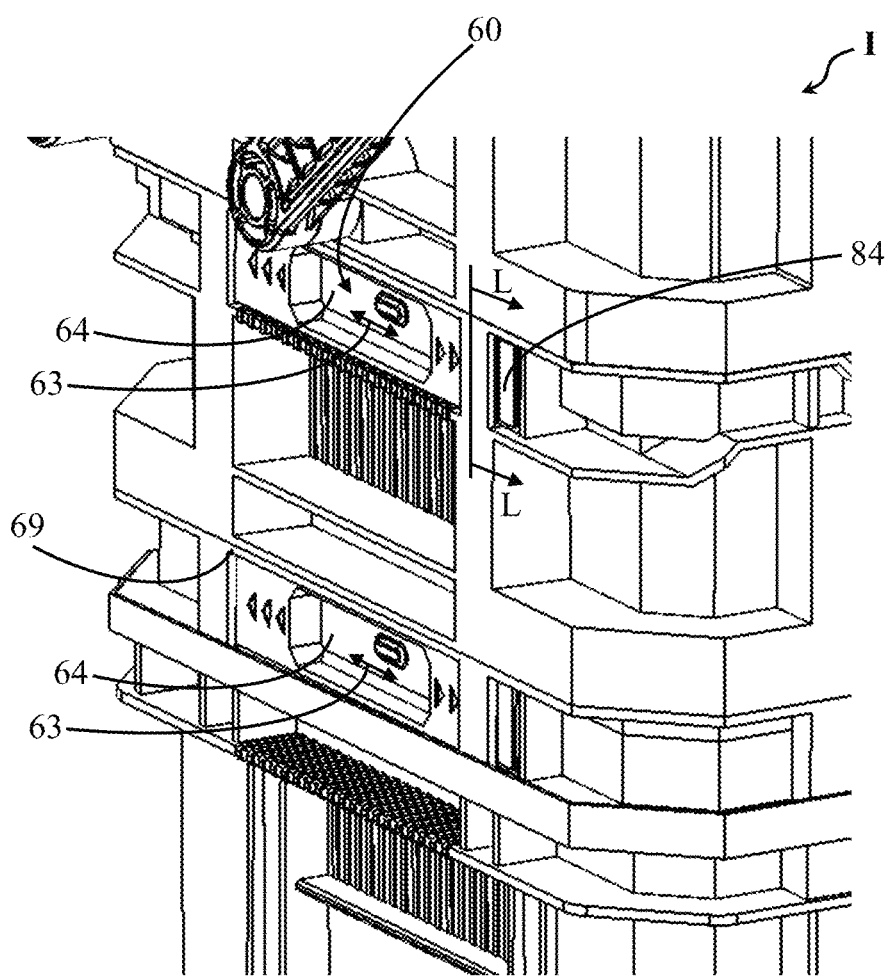
FIG. 1B is an enlargement of the portion marked I in FIG. 1A.
Figure 2A:
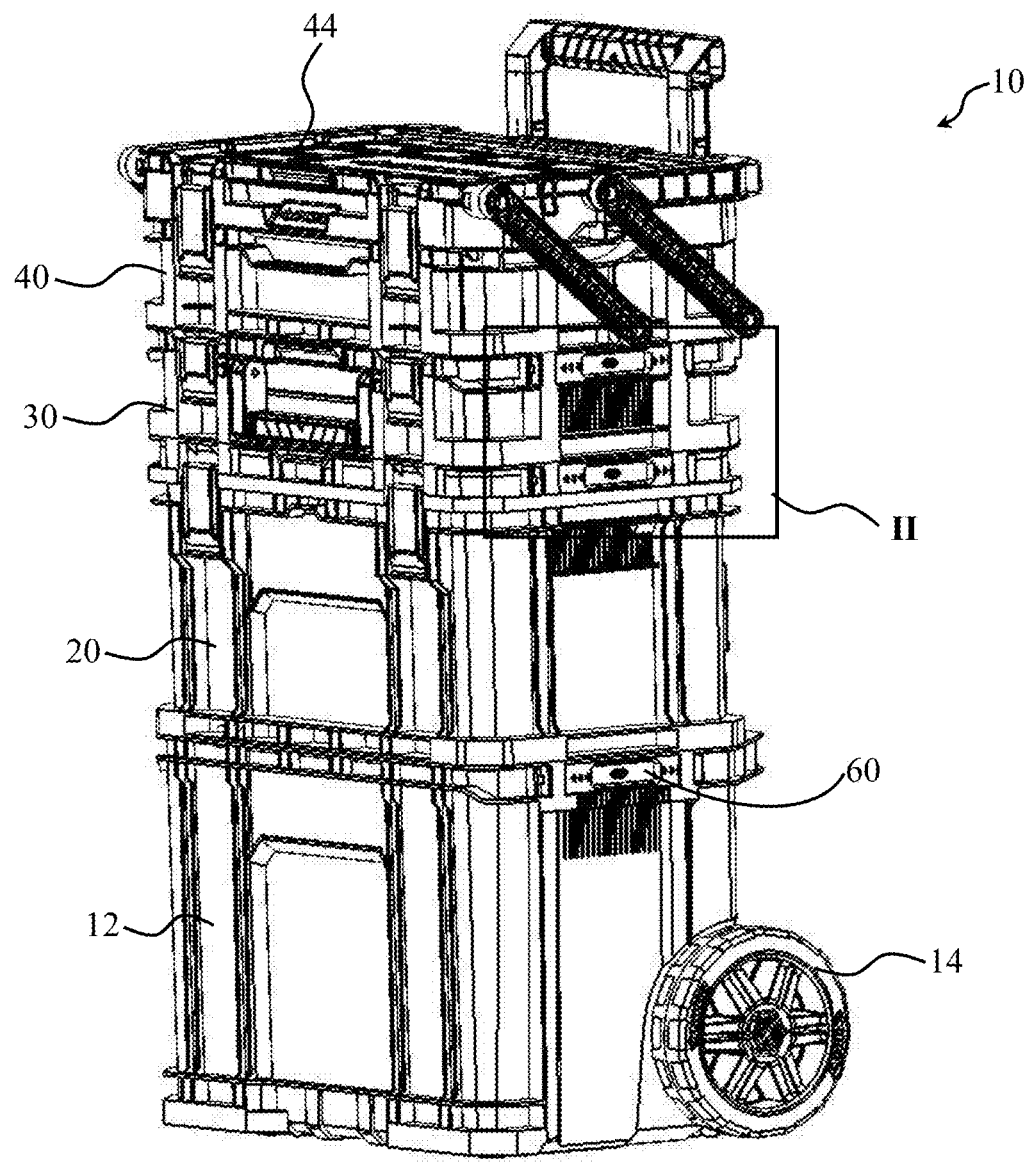
FIG. 2A is a top, front right perspective view of a container assembly according to an example of the present disclosure, the locking mechanisms at their open, unlocked position.

Attention is first directed to FIGS. 1 and 2 of the drawings directed to a first example of a container assembly according to the present disclosure. The container assembly, generally designated 10, is a wheeled tool cart assembly comprising a wheeled base open top, bucket-like container 12, fitted with wheels 14 at a bottom rear portion of the base container, and a telescopic handle 16 extending from the base container and being manipulable between a fully retracted position (not shown) and at least one extracted position for locomoting the container assembly shown in FIG. 1.

The container assembly 10 further comprises a second bucket-like container 20 mounted over container 12, said container 20 being configured with a pivotable lid 22 (the lid 22 being fitted with a carrying handle 24 as will be described with reference to FIG. 8C), said lid 22 secured by a pair of latches 26 at a front side of the container 20. Over container 20 there is an organizer-type container 30 accommodating a plurality of removable storage boxes (not seen), said container 30 being configured with a pivotable lid 32 (the lid 32 being fitted with a carrying handle 34), said lid 32 secured by a pair of latches 36 at a front side of the container 30. Over container 30, there is provided yet an organizer container 40, being a double-deck cantilever-type organizer, fitted with a top cover 44 and securable at a closed position by a pair of locking latches 46.

The arrangement is such that the containers are stacked one over the other and locked with respect to one another so as to provide to a solid, uniformly rolling tool-cart, the containers are securely locked to one another by a sliding type locking mechanism generally designated 60, as will be discussed hereinafter in greater detail. Accordingly, the second bucket-like container 20 is locked over base container 12; organizer-type container 30 is locked over second bucket-like container 20; and cantilever-type organizer container 40 is in turn locked over organizer-type container 30. When the containers are mounted over one another and at the locked position, the container assembly 10 is solid can be safely and easily rolled over the wheels 14.

The sliding locking mechanism 60 comprises a slider member 64 configured at a top portion of each container, and configured for cooperating in conjunction with a locking element 90 (seen in FIG. 5A) projecting at a bottom portion of respective containers, as will become apparent herein.

Figure 2B:
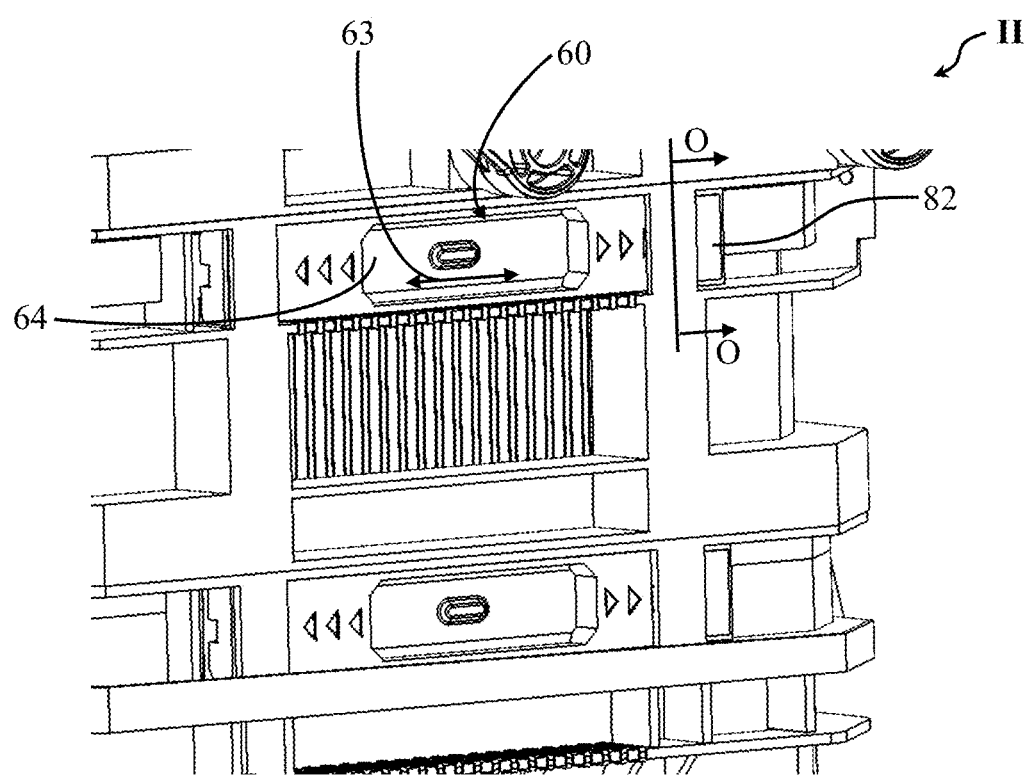
FIG. 2B is an enlargement of the portion marked II in FIG. 2A.
Figure 4A:
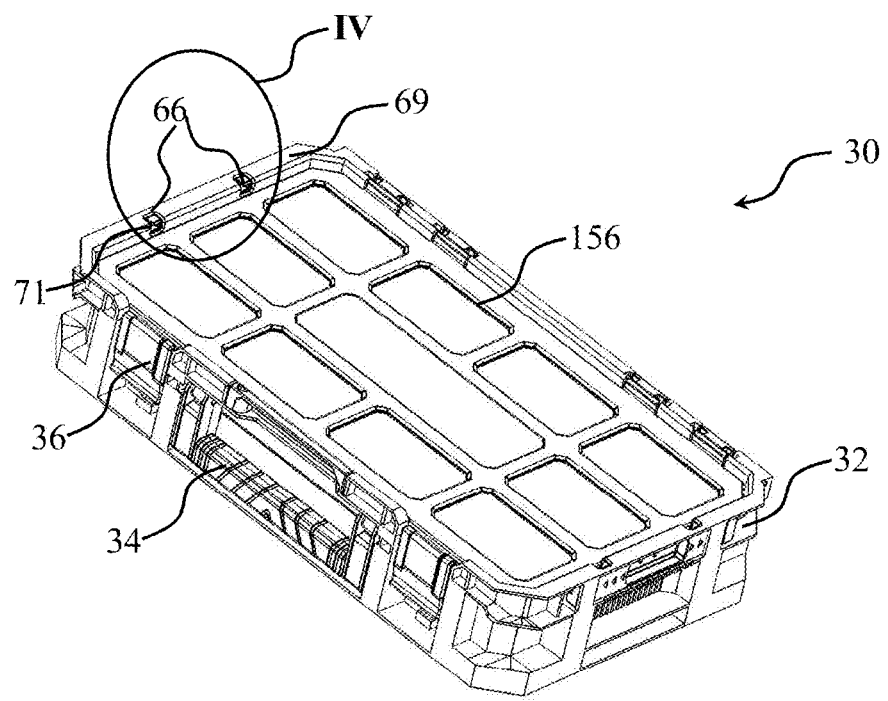
FIG. 4A is an enlarged top view of a top container of the assembly of FIG. 3.
Figure 4B:
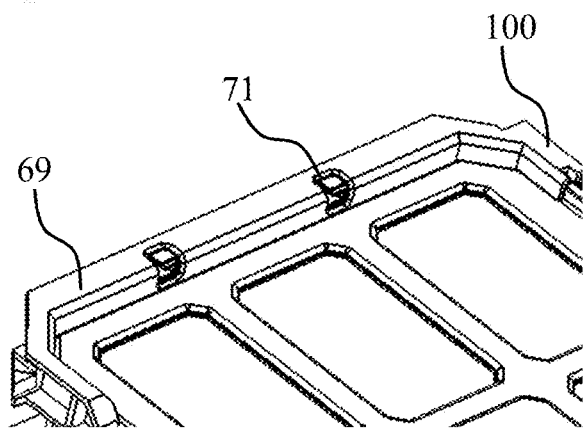
FIG. 4B is an enlargement of the portion marked III in FIG. 3.
Figure 4C:
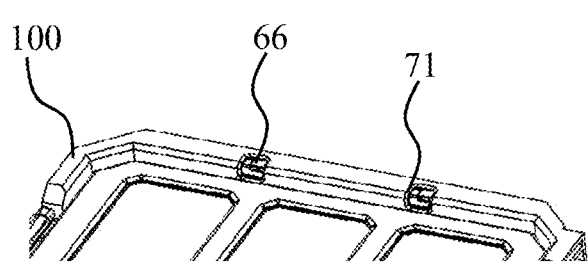
FIG. 4C is an enlargement of the portion marked IV in FIG. 4A.
Figure 7A:
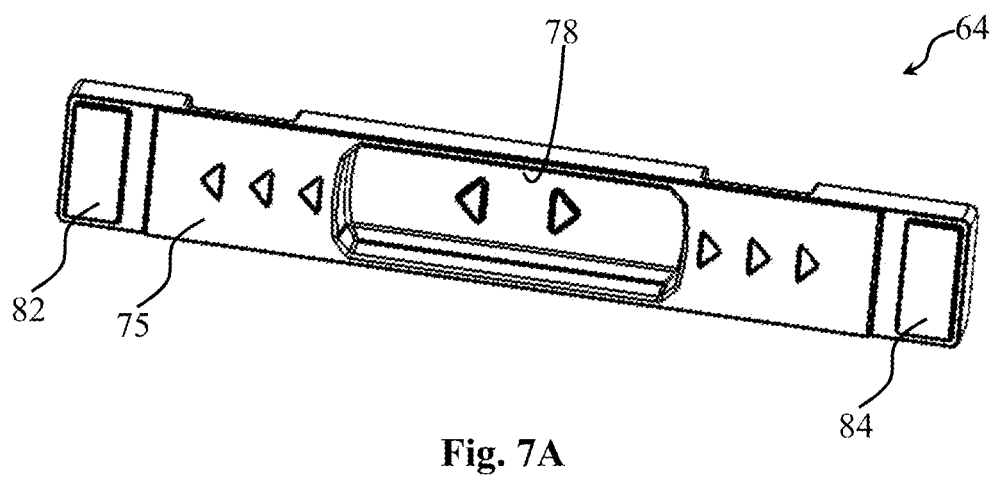
FIG. 7A is a perspective view of an outside face of a locking slide.
Figure 7B:
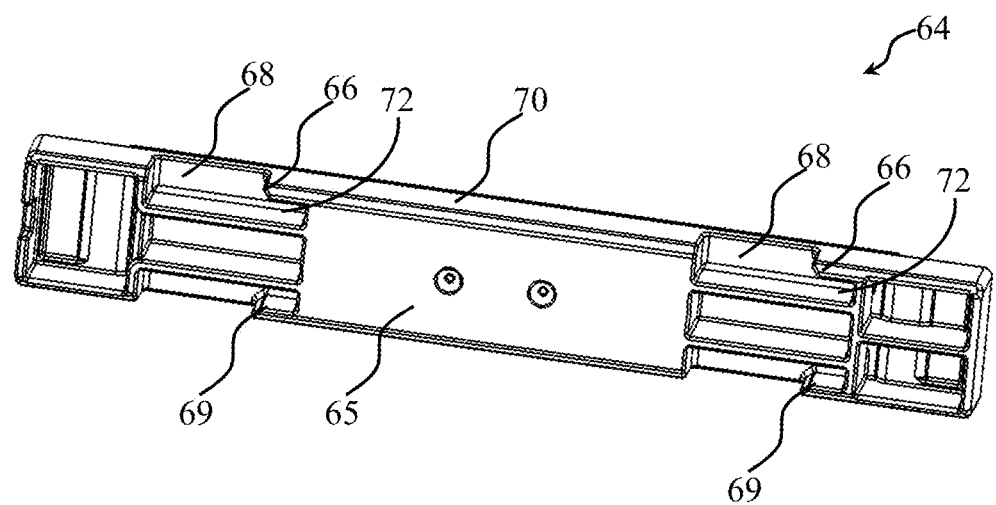
FIG. 7B is a perspective view of an inside face of a locking slide.

The slider member 64 is slidingly retained below a guard lip 69 (e.g. FIG. 4A) at a top edge of each of the respective containers 12, 20 and 30 said lip guard configured with an openings 71 extending in register with locations of the arresting elements 66 (when at the locked position) and reciprocally displaceable along the edge along arrow 63, between a locked position (FIG. 1B), and an unlocked position (FIG. 2B). The slider member 64 is in the form of a bar configured at its inside face 65 with a pair of arresting elements 66 laterally projecting and defining an opening 68 at a top edge 70 of the slider member, with a relief area 72 below said arresting elements 66. It is seen in FIG. 7B that the slider element is configured at a bottom edge thereof with another pair of arresting elements 69, rendering the slider element 64 useable for either left or right side mounting.

The slider member 64 is configured at its outside face 75 with a finger grip in the form of a depression 78, and a locked indicator (e.g. marking at 82) and an unlocked indicator (e.g. marking at 84), which during use only one of which projects from either side of the accommodating slot, indicative as to the respective locked/unlocked position.

The locking mechanism 60 further comprises a static locking element in the form of an L-shaped locking lug 90 extending at a bottom portion of a second container (i.e. containers 20, 30, 40), giving rise to a relief area 92 above said locking lug 90.

In operation, when a so-called second container (i.e. containers 20, 30, 40) is placed over any other so-called first container (containers 12, 20, 30), with the locking mechanism 60 at its open, unlocked position, the locking lug 90 protrudes into opening 71 of the guard lip 69, with a free end tip 67 of the arresting element 66 disposed opposite the relief area 92 (FIG. 6C). At this position the slider member 64 can be slidingly displaced, in direction of arrow 91 in FIG. 6B, into locking engagement with the locking lug 90, so that the of the arresting element 66 is now disposed within the relief area 92, with the arresting element 66 extending parallel above the corresponding locking lug 90 (FIG. 6D), thus preventing disengaging the containers from one another.

Unlocking the container assembly 10 takes place by displacing the arresting element 66 in an opposite direction, i.e. in direction of arrow 93 on FIG. 6B, resulting in displacement of the free end tip 67 away from the relief area 92, i.e. disengagement of arresting element 66 from the locking lug 90, facilitating detaching of the containers.

Figure 5A:
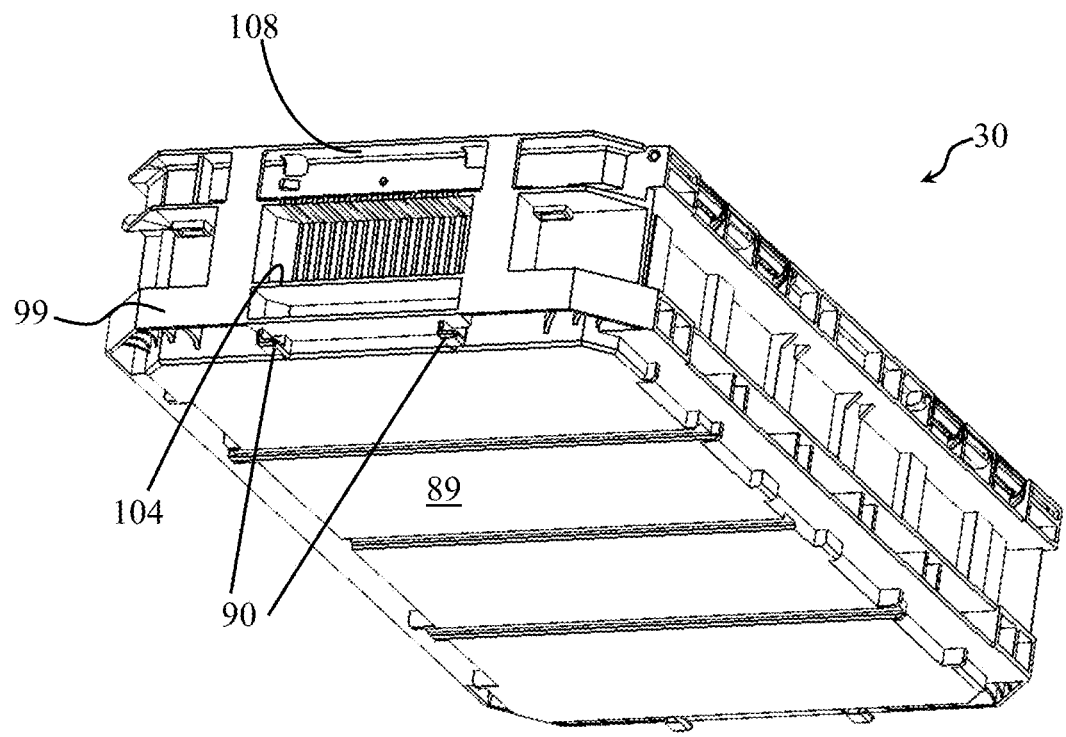
FIG. 5A is an enlarged bottom view of a top container of the assembly of FIG. 3.

It is noted that the bottom most portion of the locking lugs 90 does not project below a corresponding bottom most portion 89 of the respective second container (e.g. container 30 in FIG. 5A). This is facilitated by locating the locking lugs 90 at a bottom portion of side walls 99 of the second containers, and likewise by the provision of an upwards projection at the top of the first containers (in fact, a peripheral projection 100 at the lid 32 according to an example). Likewise, the top most portion of the arresting elements 66 does not project over a corresponding top most portion of the respective first container, minimizing potential damage to the arresting elements and the locking lugs.

Furthermore, it is shown that the container assembly is configured with two locking mechanisms 60, one disposed at each respective side of the containers. However, it is appreciated that a container assembly can be configured with more or less such locking mechanisms 60.

According to one particular example, the locking mechanisms 60 are disposed symmetrically, whereby the second container can be mounted over the respective first container at either front facing or back facing orientation (i.e. a front face of one container coextends a rear face the container disposed above).

In the disclosed arrangement the arresting elements 66 and the locking lugs 90 extend substantially parallel to one another, and the arresting elements 66 are slidingly displaceable parallel to the locking lugs 90. Likewise, in the illustrated disclosure, the slider members 64 with the arresting elements 66 are displaceable parallel to the respective guard lip 69. Furthermore, as seen best in FIGS. 6A and 6B, the slider members 64 are slidingly supported within a supporting space between two parallely disposed surfaces 104 and 108 (FIGS. 5A, 6A, 9A and 9B).

Whilst in the illustrated examples the first container (i.e. a bottom container of a pair of a container assembly) is configured with the first locking member (i.e. in form of the slider locking member) and the second container (i.e. a top container of a pair of a container assembly) is configured with the second locking member (i.e. in form of the static locking element), it is noted that these can be otherwise configured, namely with the second locking member configured at the first container and with the first locking member configured at the second containers, respectively.

According to a particular configuration, either or both a surface of the sliding member and of the wall surfaces slidingly supporting the sliding member are configured with protrusions and or depressions (not seen), whereby the sliding member is prevented from spontaneous displacement between its respective locked and unlocked positions, as it requires some degree of force to displace same, optionally in a 'clicking' manner.

Whilst in the illustrated examples the second containers are stacked over the respective first containers, it is appreciated that according to yet an example of the disclosure, the second container can be at least partially nested within the respective first container, however with a projecting portion of the second container extending above a top edge of the respective first container, wherein the second locking member is thus configured at said projecting portion of the second container.

Figure 5B:
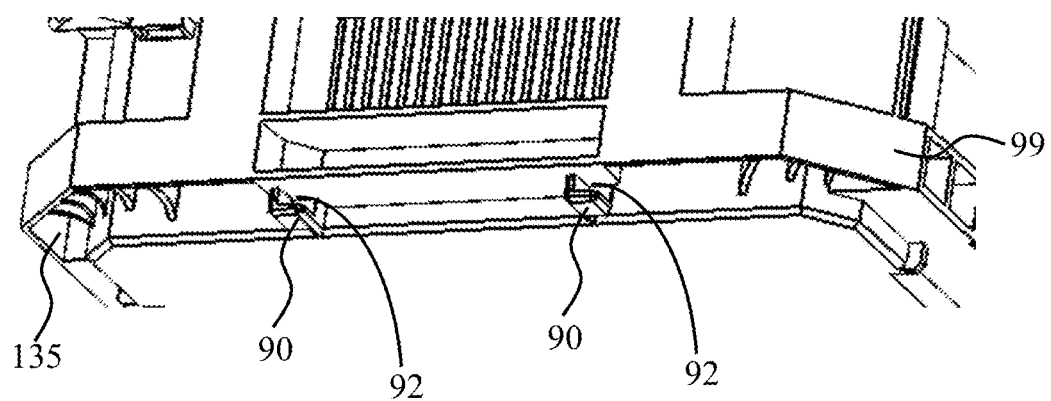
FIG. 5B is a close-up view of the bottom of the top container of FIG. 5A.

In order to ensure smooth and easy locking of the locking mechanism, it is required that the second locking member, namely the static locking lug 90 extend in place opposite the relief area 72 below said arresting elements 66. This is facilitated by providing true positioning arrangement of the second container over first container, whereby location arrangements are configured, namely groove 135 (FIG. 5B) at least partially surrounding a bottom portion of the respective second container, and configured for easy mounting over the peripheral projection 100 at the lid 32.

According to a different example of the disclosure, the slider member is normally biased into the locking position, whereby displacing it into the open position requires overcoming the biasing force. This can be facilitated by manually displacing the slider member into the open position, or by configuring facing edges of the corresponding free end tip 67 of the arresting element 66 (FIGS. 6C and 6D) and the free end of the locking lug 90, with a chamfered portion (138 and 140, shown in FIGS. 6C and 6D), whereby positioning the second container over the first container at an engaging position, generates a reactionary force between said chamfered portions 138 and 140, having a resultant force component in a lateral direction, entailing corresponding lateral momentary displacement of the slider member 64 into the open position, facilitating the locking lug 90 to snap below the arresting element 66 with the slider member returning to its locked position under the biasing effect (FIG. 6D).

Figure 3:
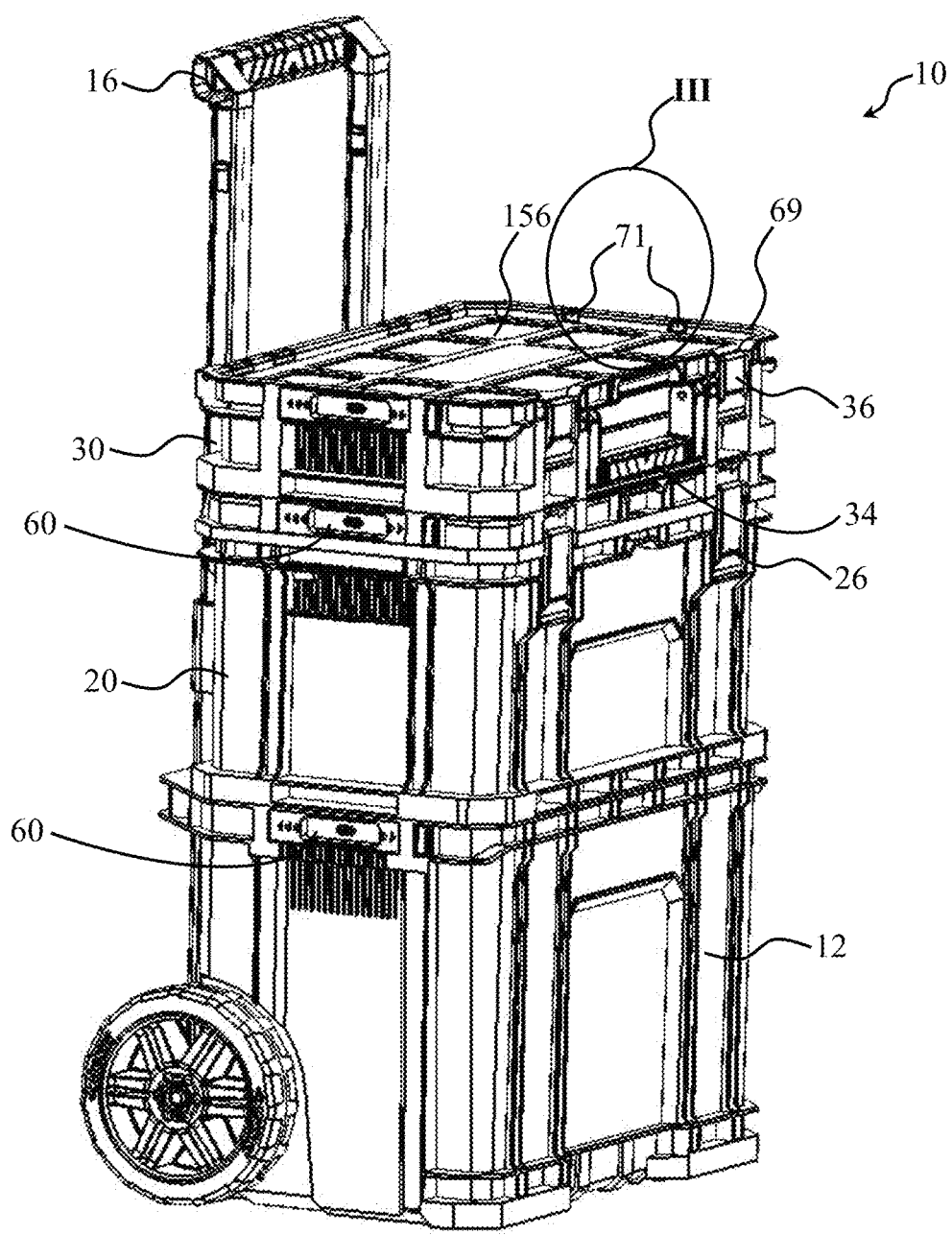
FIG. 3 is a top, front left perspective view of a container assembly according to another example.

Reverting now to FIG. 3 of the drawings, the container assembly 10 of FIGS. 1 and 2 is illustrated, however with the organizer container 40 removed. It can be seen (also in FIG. 4A) that the top cover 156 of the uppermost container 30 has a top face substantially similar to top face of cover 44 of that of organizer container 40. This arrangement applies to other containers too, e.g. container 20 has a top face 158 (FIGS. 8B and 8C) substantially similar to top cover 156 of container 39. Like wise to bottom faces of such containers, rendering modularity of the container assembly. Accordingly, the containers of the container assembly have matching top faces and bottom faces, whereby any second container of the assembly can be mounted over any first container, at any order. The above applies also in the case of a bucket-like container (e.g. container 12 of the assembly), whereby the top peripheral portion 100 mimics the top of any other container of the assembly.

Figure 8A:
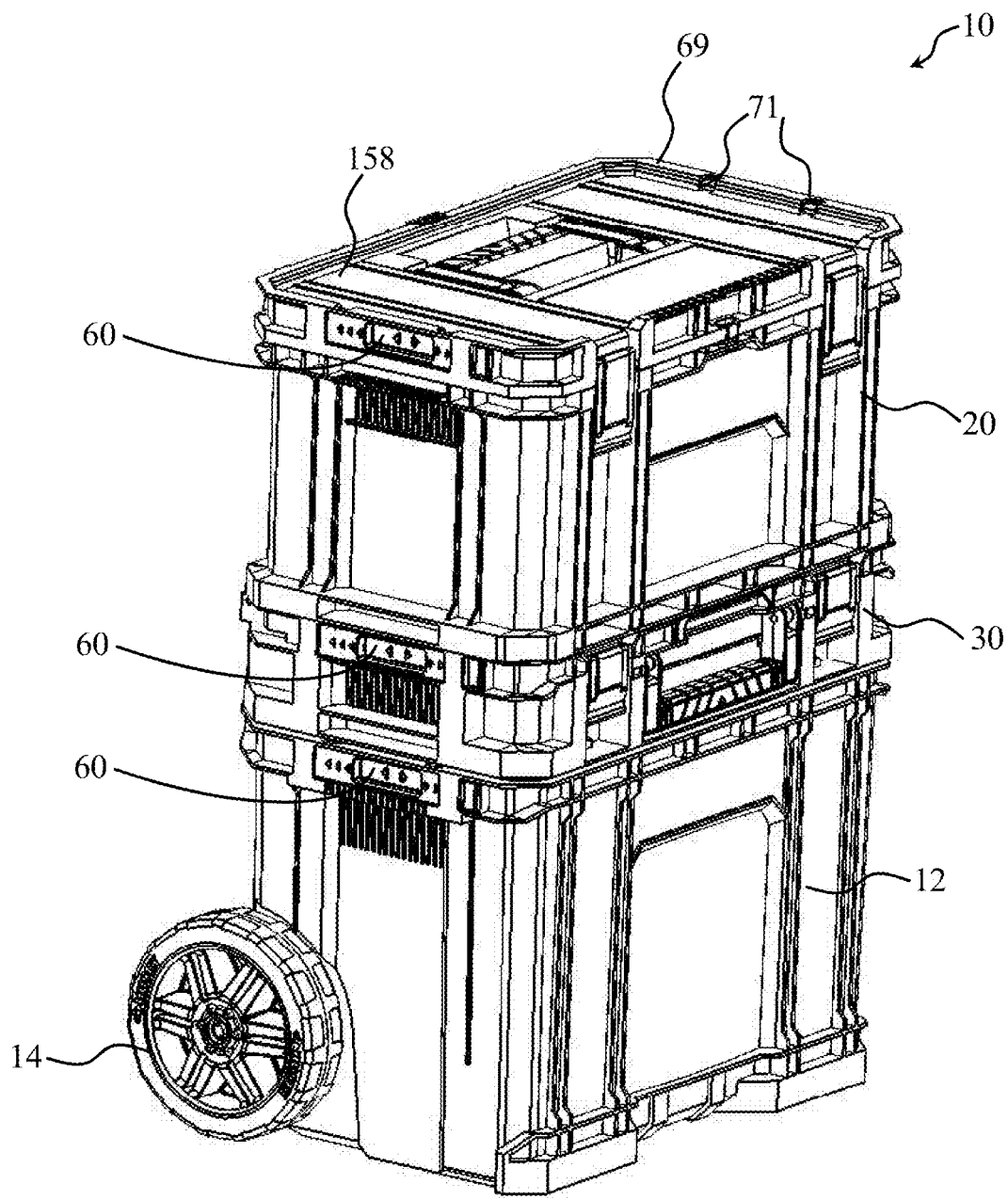
FIG. 8A is a perspective view of a container assembly according to another example.
Figure 8B:
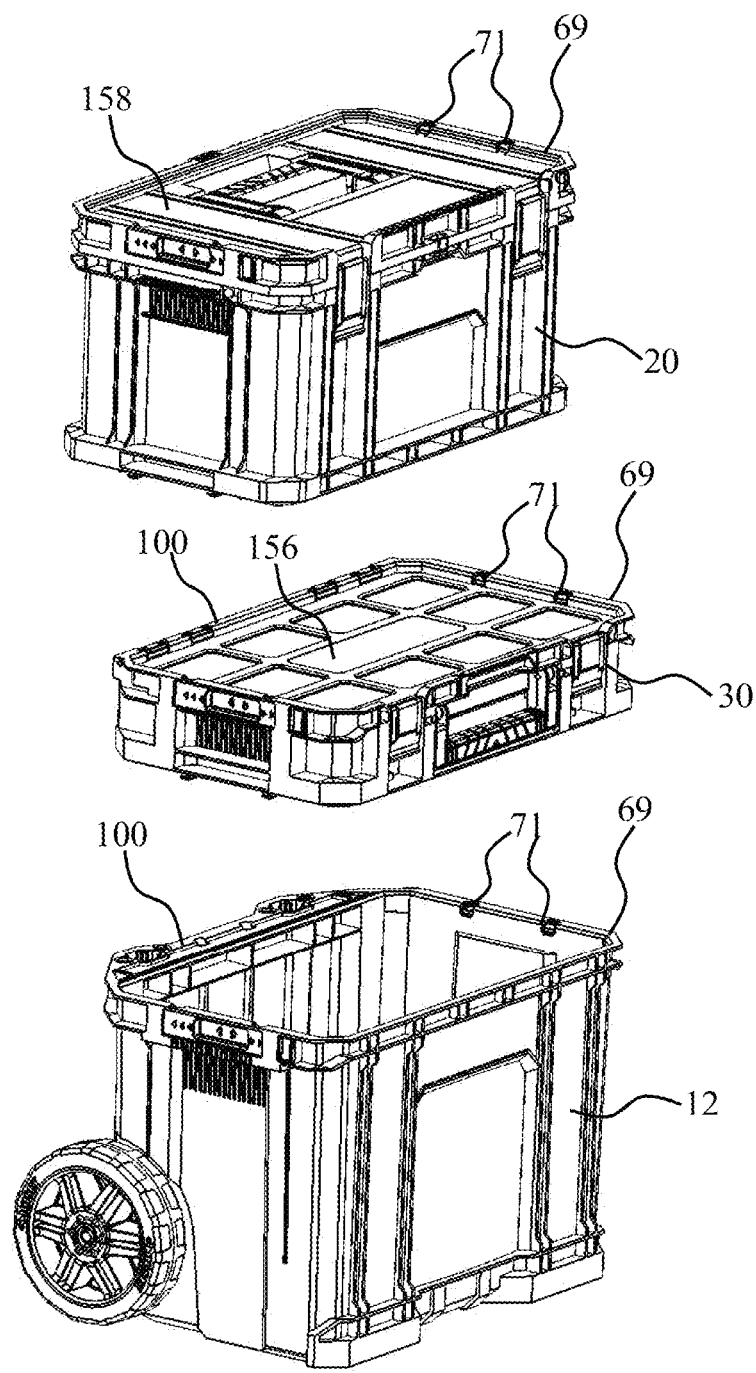
FIG. 8B is an exploded view of the principle components of the container assembly of FIG. 8A.

One example of modular assembly is shown in FIG. 8A, wherein the wheeled base container 12 serves as a first container and wherein a second container in the form of organizer container 30 is mounted over the open top bucket-like container 12, with locking mechanism 60 securely fixing the two. Further above, the container 30 serves as a first container wherein a second container now takes form by container 20, locked over container 30 by locking mechanism 66. It is seen that the container 20 is configured with a locking mechanism 60 of the above described configuration and has a modular top face 158, whereby it is ready for locking receiving thereover any other container of the assembly.

Figure 8C:
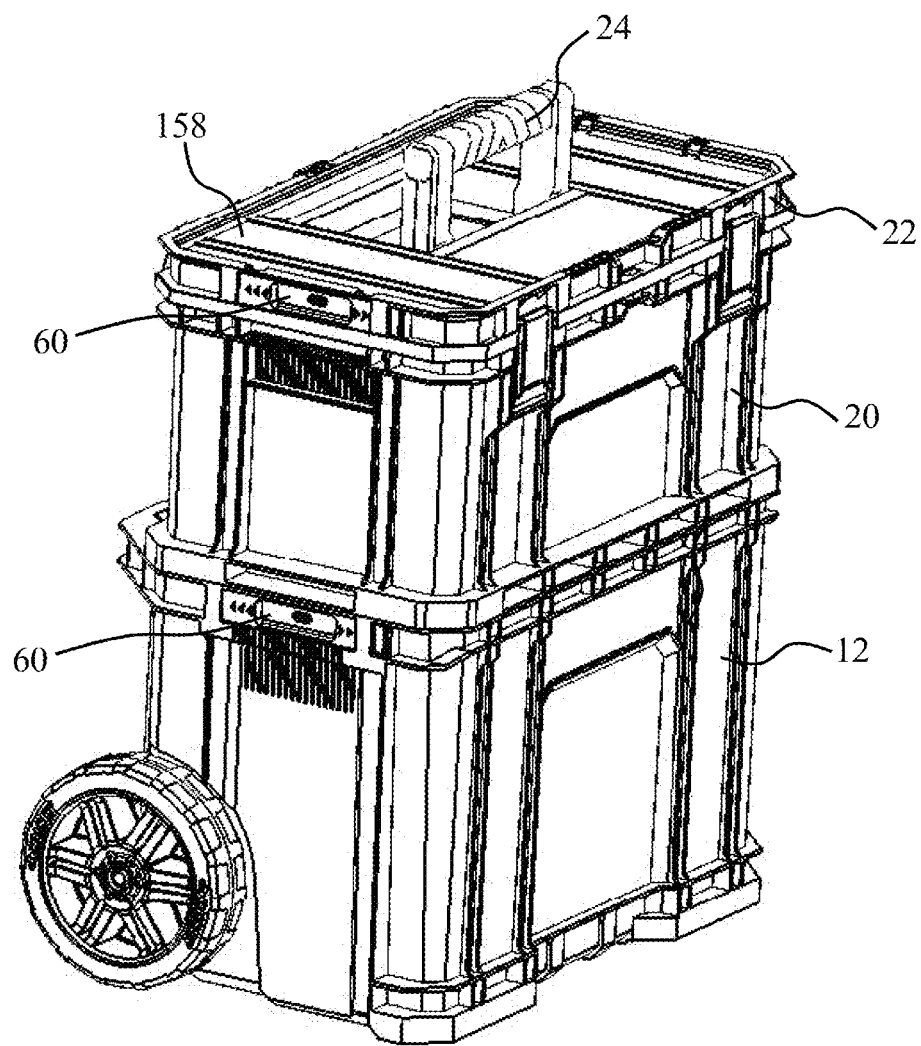
FIG. 8C is a modification of the container of FIG. 8A.

In FIG. 8C a container 20 with lid 22 is mounted over the open top bucket-like container 12, with locking mechanism 60 securely fixing the second container 20 over the first container 12. It is seen that the second container 20 is configured with a locking mechanism 60 of the above described configuration and a modular type top face 158, whereby it is ready for locking receiving thereover any other container of the assembly. In this case the assembly can be rolled over the wheels 14 by the telescopic handle assembly 16 (removed in this drawing) or by aid of carrying handle 24 fitted at cover 22.

Figure 8D:
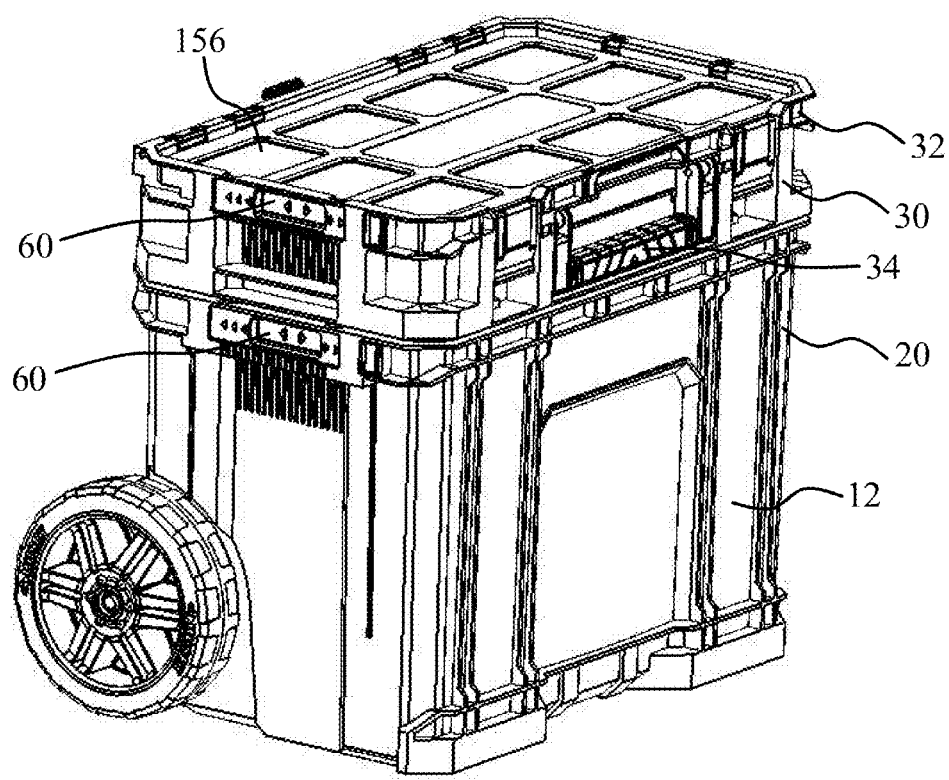
FIG. 8D is another modification of the container of FIG. 8A.
Figure 9A:
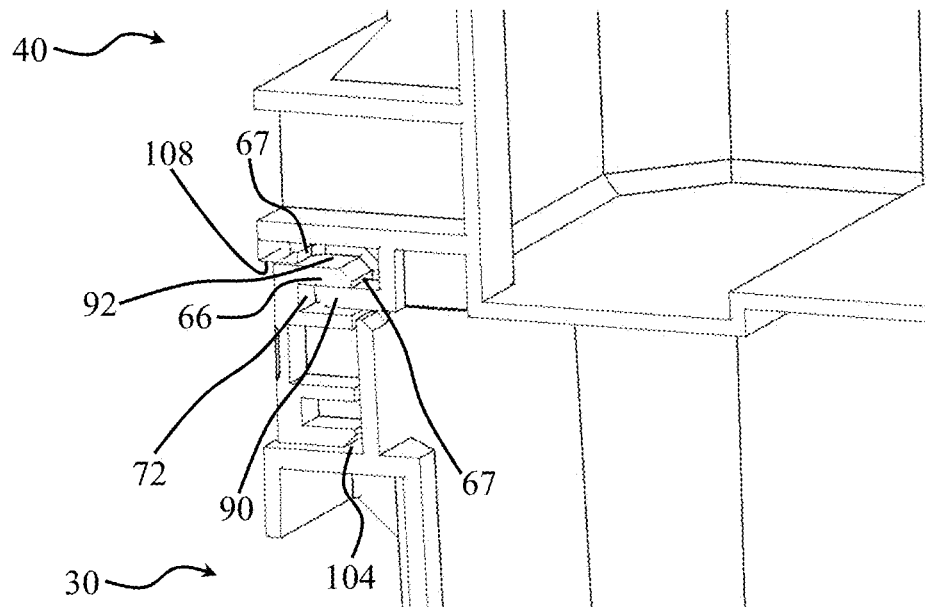
FIG. 9A is a portion of a section along line L-L in FIG. 1B.
Figure 9B:
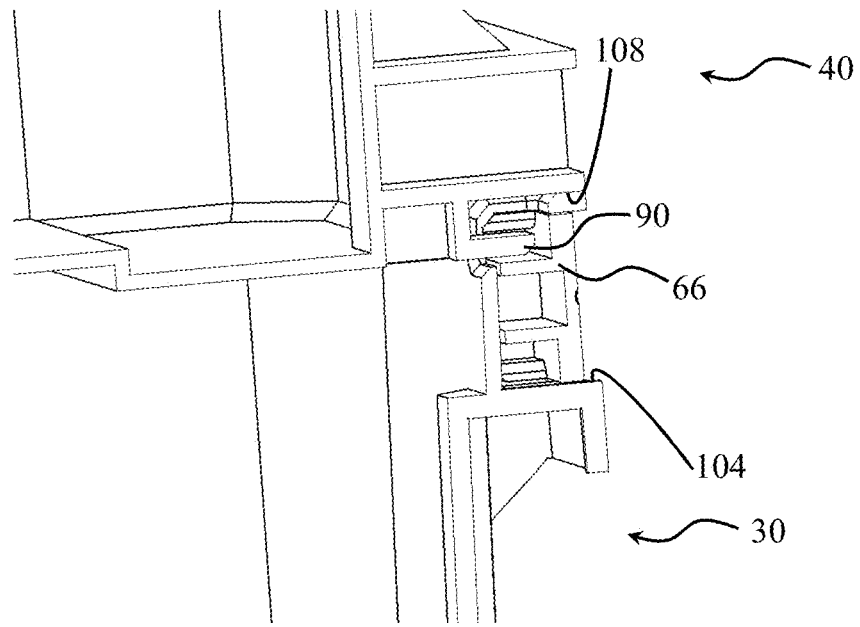
FIG. 9B is a portion of a section along line O-O in FIG. 2B

Another example is illustrated in FIG. 8D, wherein a second container is now in the form of organizer container 30 mounted over the open top bucket-like container 12, with locking mechanism 60 securely fixing the second container 30 over the first container 12. It is seen that the second container 30 is configured with a locking mechanism 60 of the above described configuration and has a modular top face 156, whereby it is ready for locking receiving thereover any other container of the assembly.

Figure 10:
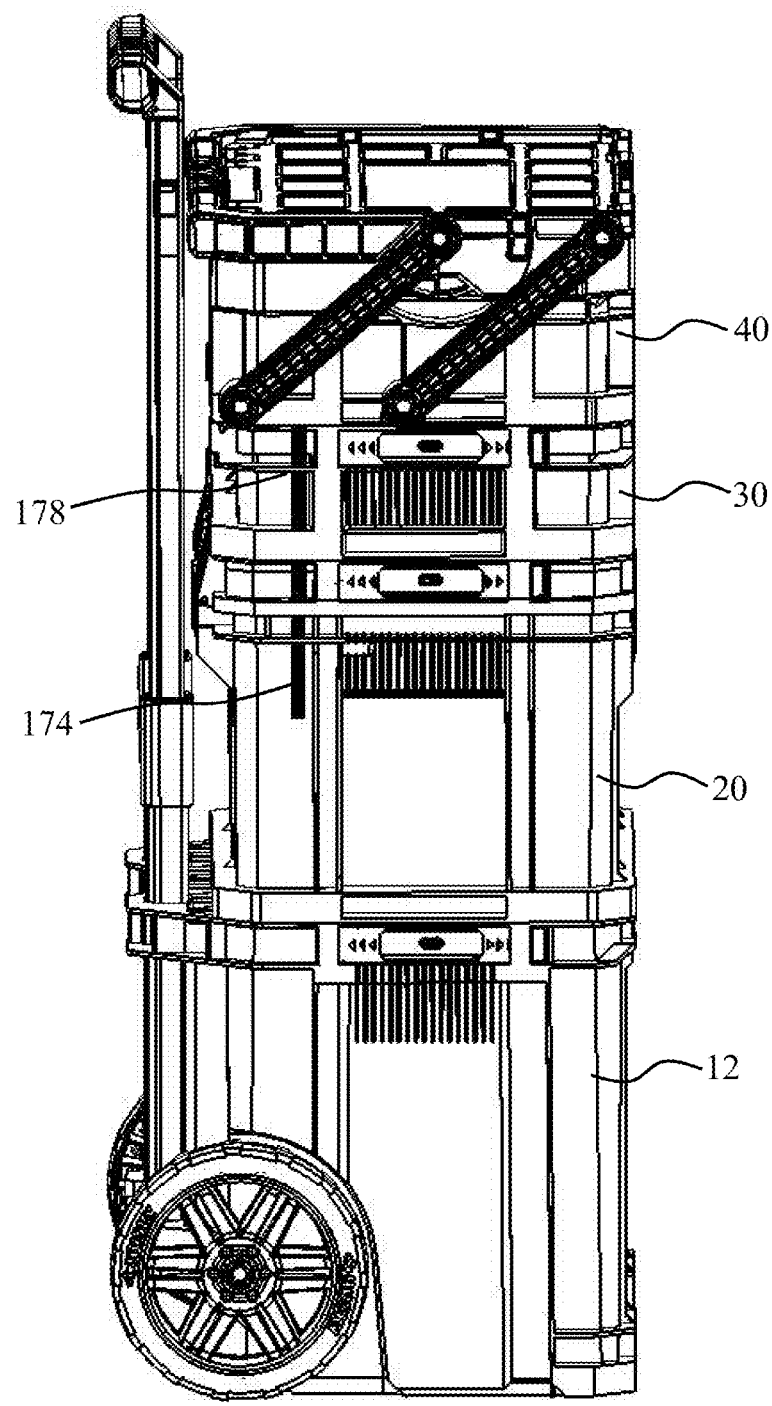
FIG. 10 illustrates the container assembly of FIG. 1A, fitted with a locking arrangement.

Turning now to FIG. 10 of the drawings there is illustrated a container assembly 10' according to the disclosure, wherein there is provided an unlocking mechanism in the form of a rod 174 extending through openings 178 of the respective containers. The rod 174 is secured in place, for example by a pad lock (not shown). The arrangement is such that the rod 174 extends in close proximity to the housing portion of each container accommodating the locking mechanism 66, whereby when the rod 174 is in place all the slider members 64 of the locking mechanisms are arrested at their locked position, preventing their sliding displacement into the open position, whereby all containers of the assembly are locked over one another. An optional locking configuration is obtained by applying a pad lock through each or selective openings 178, resulting in selective locking arrestment of locking mechanisms 66.

With further reference to FIGS. 11 to 16 there is disclosed a container locking mechanism according to the second aspect of the present disclosure. In the illustrated example the container assembly, generally designated 200, comprises three substantially rectangular containers, namely a base container 204 fitted with a pair of locomotive wheels 206 and a telescopic manipulating handle 210 (FIG. 12A; illustrated at a retracted, collapsed position). Container 204 is a bucket-like container, i.e. configured with a top opening and typically suited for carrying large items such as hand tools and the like. Mounted over base container 204 there is a second container in the form of a tool box container 214 (of the type comprising a pivotally secured lid closeable by toggle latches 216 (FIG. 11A)). An organizer-type container 220 is mounted over the tool box 214, with a pivotal carrying handle articulated thereto.

The disclosed arrangement thus illustrates three containers mounted on top of one another, wherein the base container 204 is referred to as a first container and the tool box container 214 mounted thereover is referred to as a second container. However, when referring to the relation between the tool box container 214 and the organizer container 220, then the tool box container 214 is referred to as a first container and the organizer container 220 mounted thereover is referred to as a second container. That being said, it is appreciated that the disclosed locking arrangement refers to locking engagement between any first container and second container mounted thereover. It is also noted that the container assembly is modular in the sense that any container may be mounted and locked over any other container, even without the base container 204 (with the exception that the base container always serves as a first container).

As can be seen in the annexed figures, each first container (in the present example each of the three containers 204, 214 and 216) is fitted with a top base portion 230 and a bottom base portion 234 (save for the base container 204). Each of the three containers is configured with an upwardly projecting support rim 238, at least partially encircling/circumferencing a top face thereof, however extending at least at side wall portions of the respective containers. The support rim thus constitutes a nesting portion, at least partially circumferencing the top base portion of the containers.

The tool box container 214 and the organizer-type container 220 are configured at their base with a nestable portion 240 (i.e. a downward extending basin like portion) shaped and sized for at least partial nesting within boundaries of the nesting portion defined by the support rim 238, however wherein at the assembled position a shoulder seat portion 242 of the nestable portion 240 bears over at least portions of the support rim 238.

Each of the three containers 204, 214 and 216 is configured at two opposite side walls with a locking mechanism generally designated 245, comprising a locking member 248 pivotally secured at the top portion 230 of the so-called first container (however seen in each of the illustrated containers), said locking member 248 configured with at least one locking latch 250 configured for locking engagement within a locking receptacle 254 formed at the base portion 234 of each second container (containers 214 and 216 in the present case).

The locking member 248 is pivotally displaceable between a locked position (FIGS. 11B, 12A, 12B, 13A to 13E), in which the at least one locking latch 250 is engaged within the respective locking receptacle 254 of the second container mounted thereover, and an unlocked position (FIGS. 11B to 11E, 15A to 15C) in which the locking member 248 is outwardly pivoted and the wherein the at least one locking latch 250 is disengaged form the respective locking receptacle 254, wherein the second container can be separated from the first container. According to a particular configuration, pivotal displacement of the locking member between its respective locked position and unlocked position is about 15°.

The locking latches 250 are displaceable through latch passages 280 extending through the support rim 238, wherein the locking latches 250 are displaceable between the locked position at which they radially project inwardly from an inner edge of the support rim 238, and the unlocked position wherein the latches 250 are concealed, i.e. do not project from the support rim 238, so that the latches are protected and are not exposed to undesired impact.

As can be seen, pivotal displacement of the locking member 248 is translated into radial displacement of the locking latch 250. Further, in the illustrated example each locking member is configured with two locking latches 250. The locking member 248 is articulated at the top portion of the containers and is pivotable about a horizontal axis designated X (when the respective container is placed over a leveled surface, parallel to the top/bottom base thereof).

In order to facilitate easy and smooth placing of a second container over a first container, in the nesting arrangement as disclosed herein above, the nestable portion 240 and the support rim 238 of the nesting portion are configured with chamfered gliding surfaces 260 and 262, respectively.

The locking member 248 has also a carrying handle 266, and is configured with an gripping portion, whereby a container can be carried at either the locked position and the unlocked position, the carrying handle 266 extends within a recess 268 formed at the side wall of the container, thus providing to a griping space facilitating an individual to insert his fingers for gripping said gripping portion.

The locking latches 250 are configured with an upward projection 270 and the top face of the support rim at the vicinity of the latch passages 280 is configured with an arresting opening 274, wherein pivotal displacement of the locking member 248 is restricted at its unlocked position and the locking member is prevented from dispositioning. Furthermore, the locking member 248 is configured at a top face thereof with several bulges 278 for substantially reducing or eliminating slack of the locking member and friction arresting thereof, and wherein at least one bulges is configured for protruding into a respective depression 280 configured at an inner top wall of the support rim, for snapingly arresting of the locking member at the locked position, and preventing spontaneous displacement of the locking member into the unlocked position.

Reverting now to the locking receptacle 254 configured at the respective bottom base portion 234 of each second container, it is noted that said locking receptacle 254 is configured at the seat portion and has an opening 284 on a side face of said seat portion, said opening disposed in alignment with a respective locking latch 250 of the locking member 248. Further, the locking latch 250 is configured at a fore bottom end portion thereof, with a projection 288 (best seen in FIG. 11D), configured in turn for snapingly arresting within a corresponding opening 290 at a bottom wall portion of the locking receptacle 254, for arresting the latch and hence the locking member at the locked position, whereby manual manipulation is required for displacing the locking handle into the unlocked position.

Figure 11A:
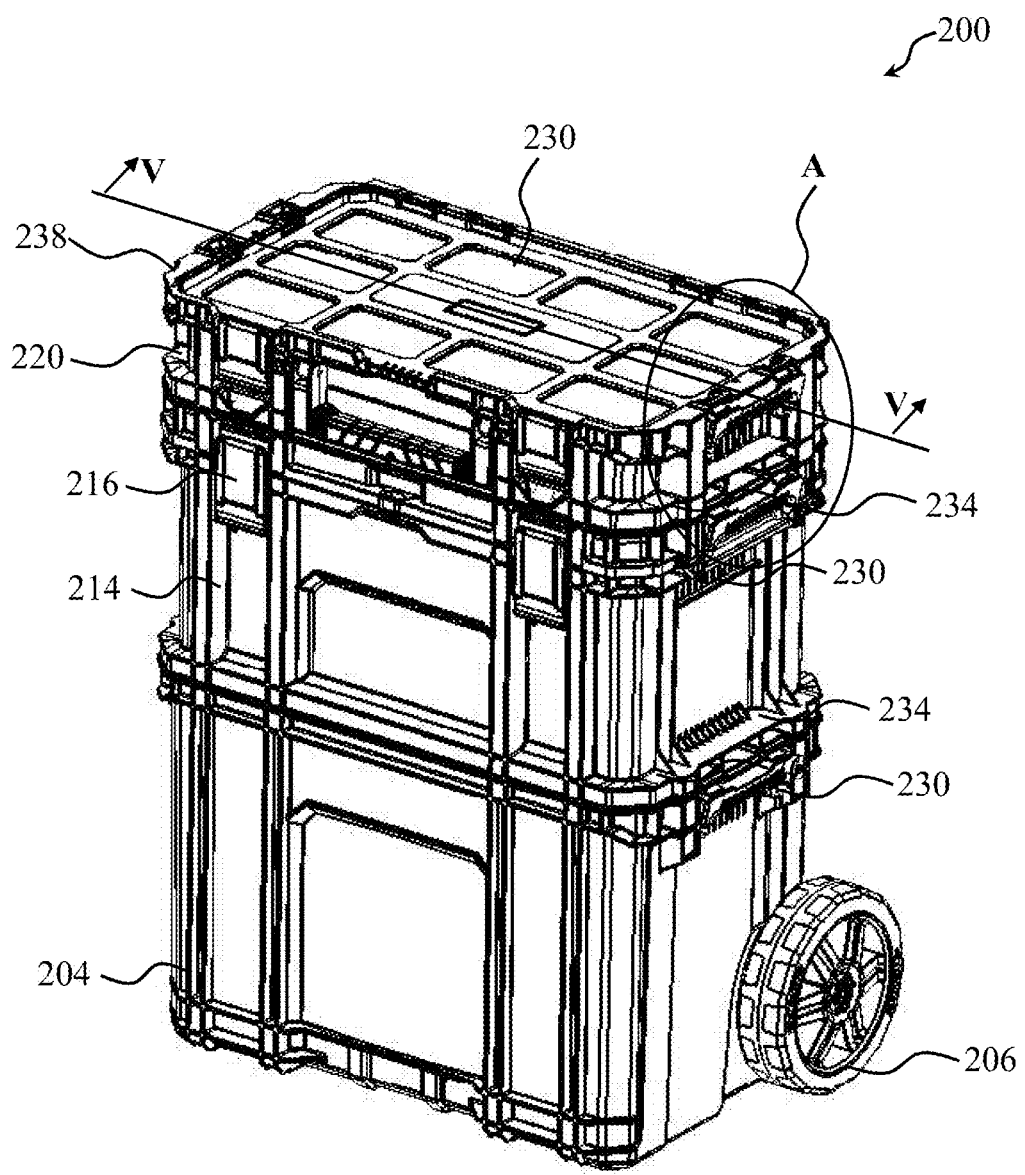
FIG. 11A is a top front right side perspective view of a container assembly according to an example of the present disclosure.
Figure 11B:
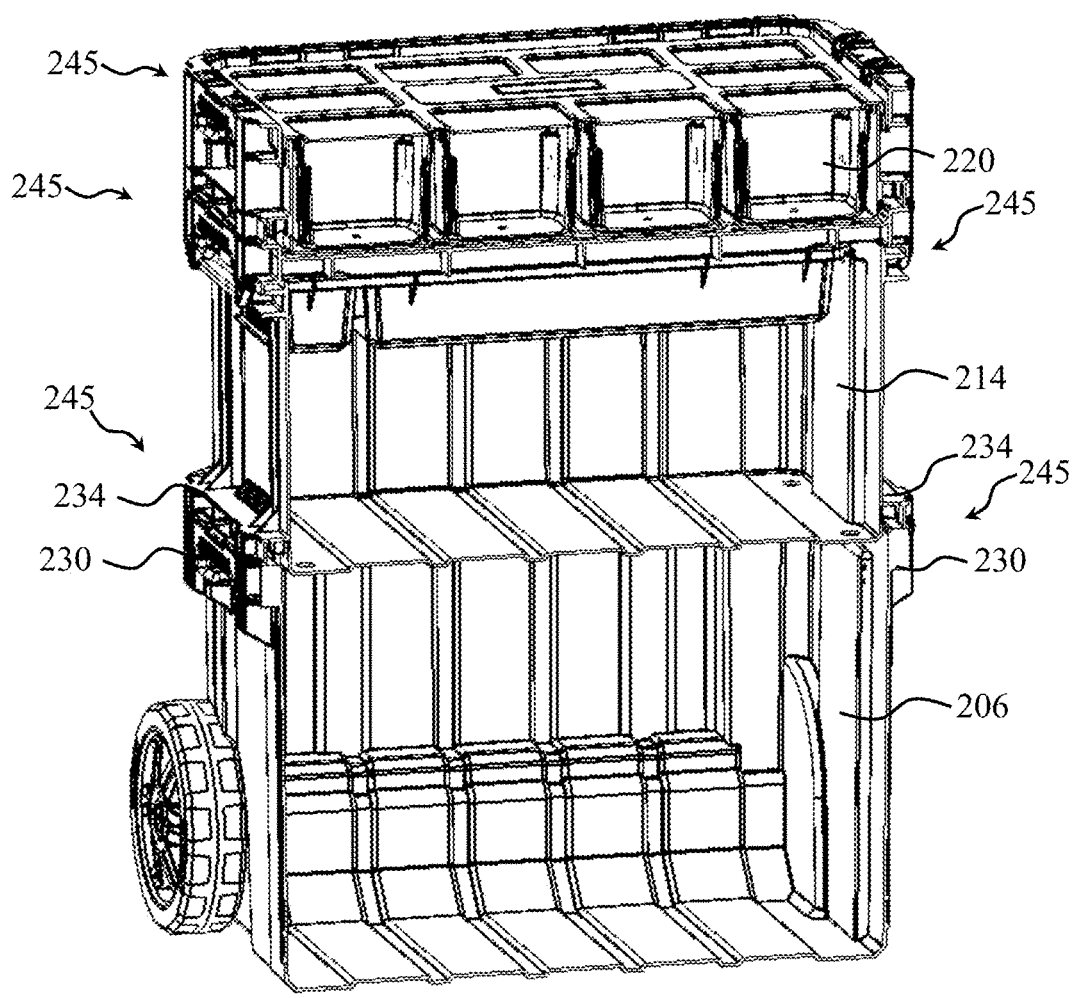
FIG. 11B is a longitudinal section along line V-V in FIG. 11A.
Figure 11C:
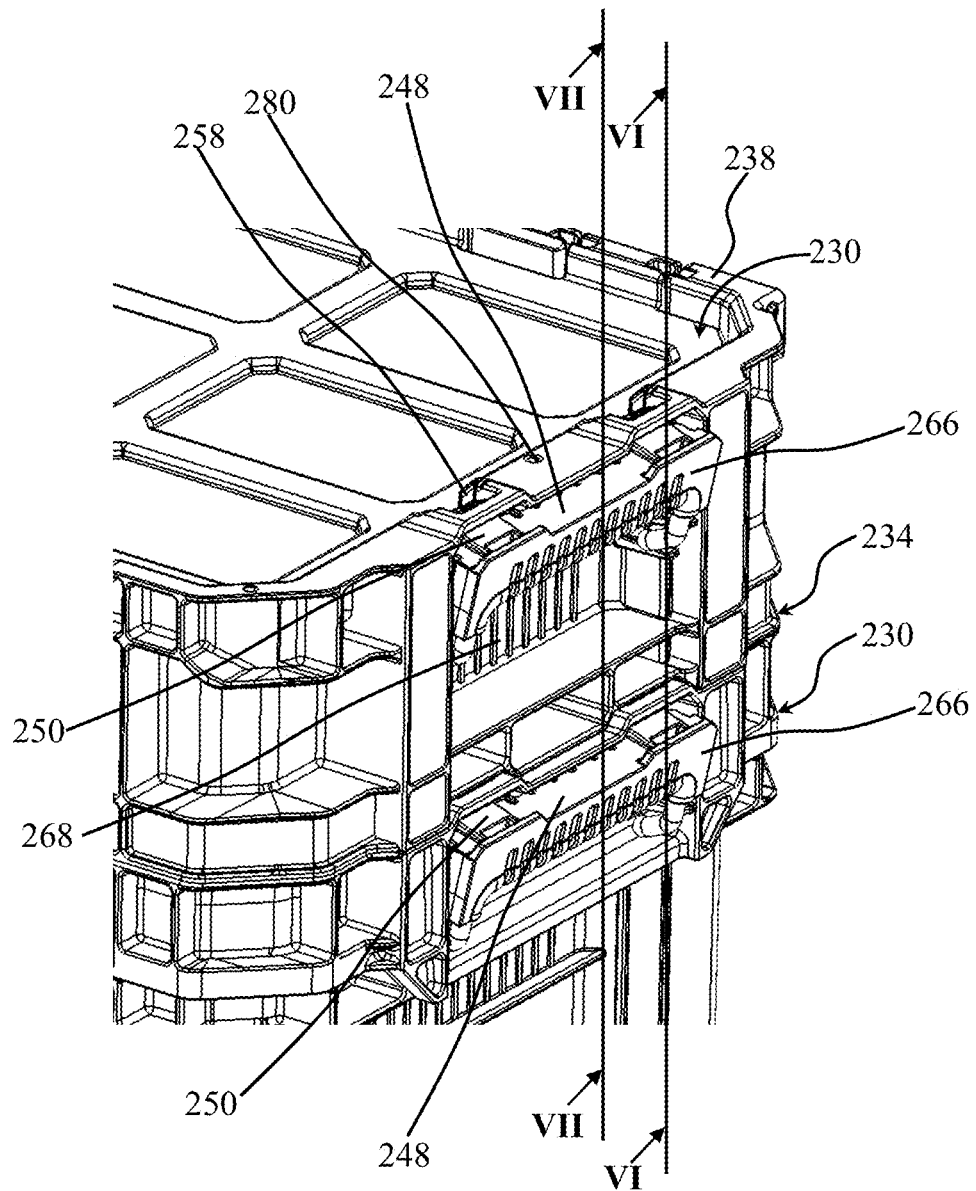
FIG. 11C is a close-up on the portion marked A in FIG. 11B, showing a locking arrangement of a second aspect of the disclosure, at its unlocked position.
Figure 11D:
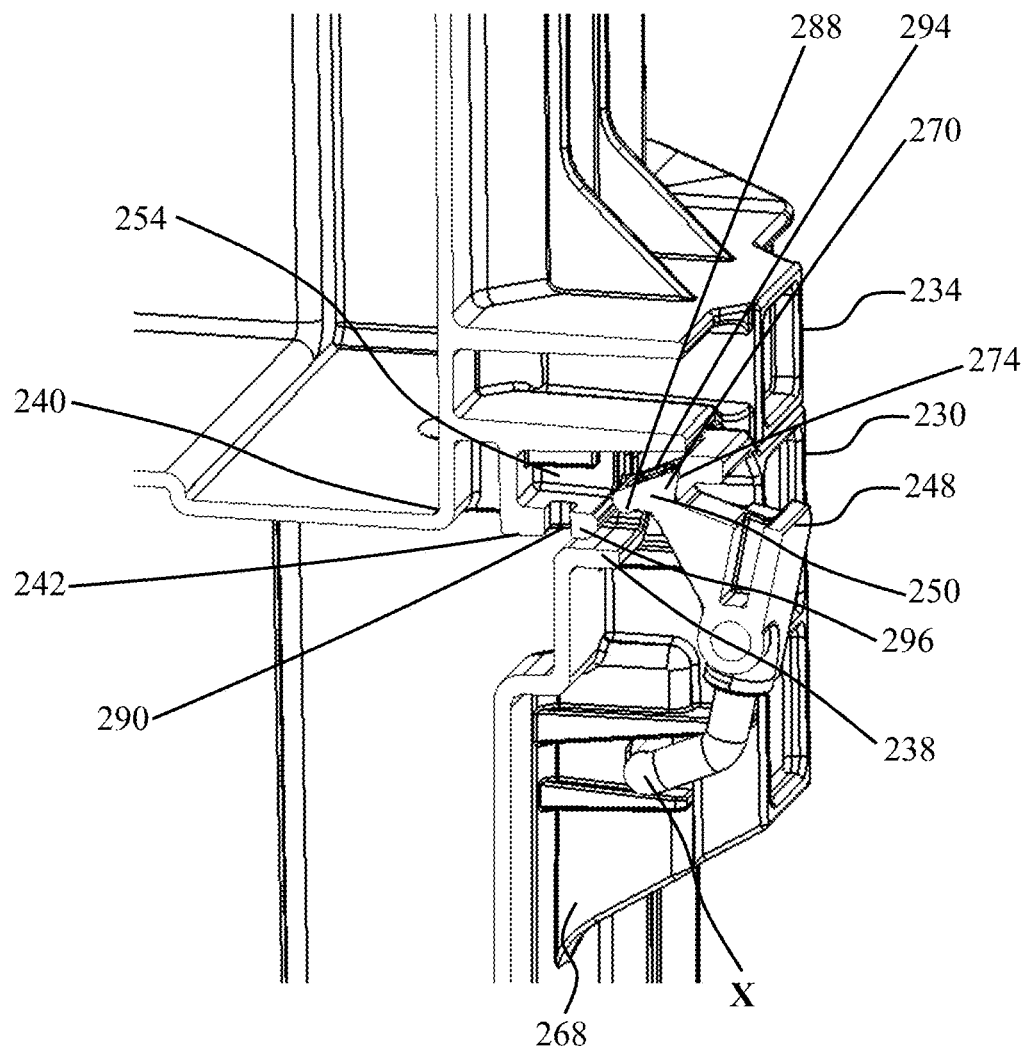
FIG. 11D is a section along line VI-VI in FIG. 11C.
Figure 11E:
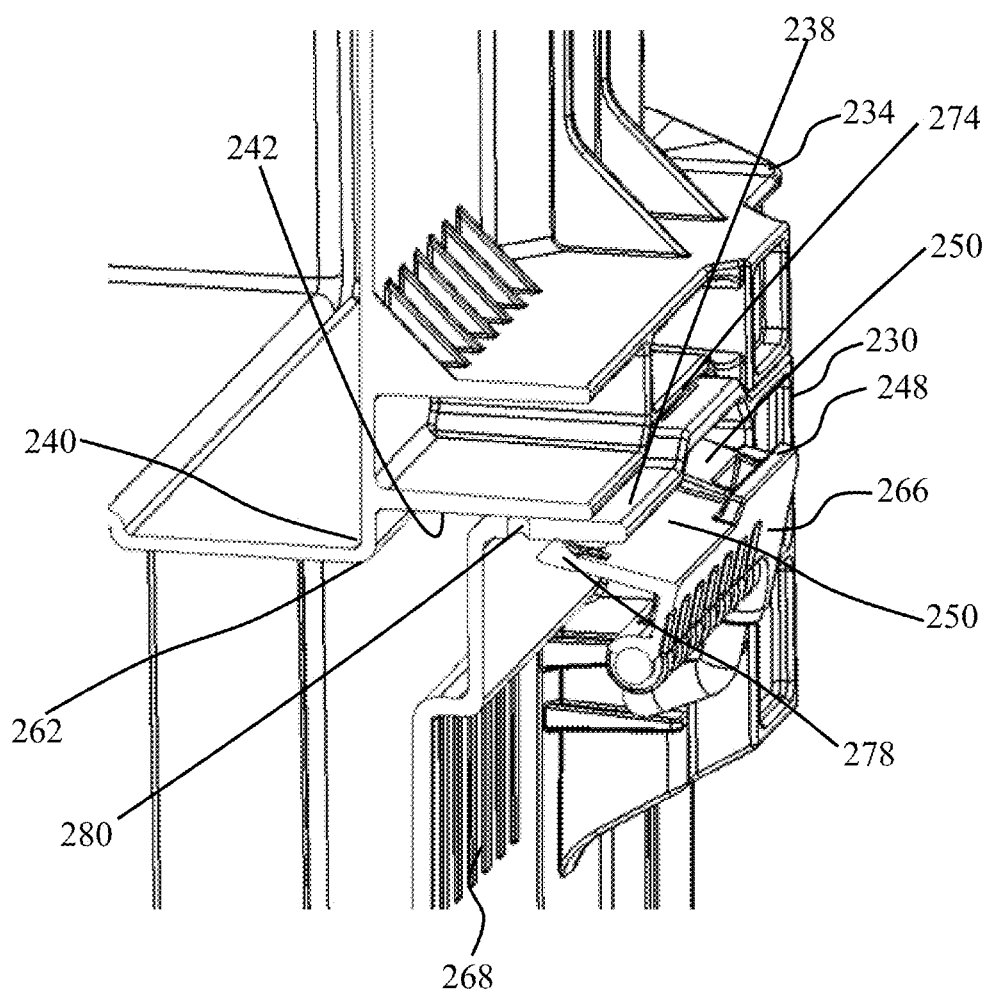
FIG. 11E is a section along line VII-VII in FIG. 11C.
Figure 12A:
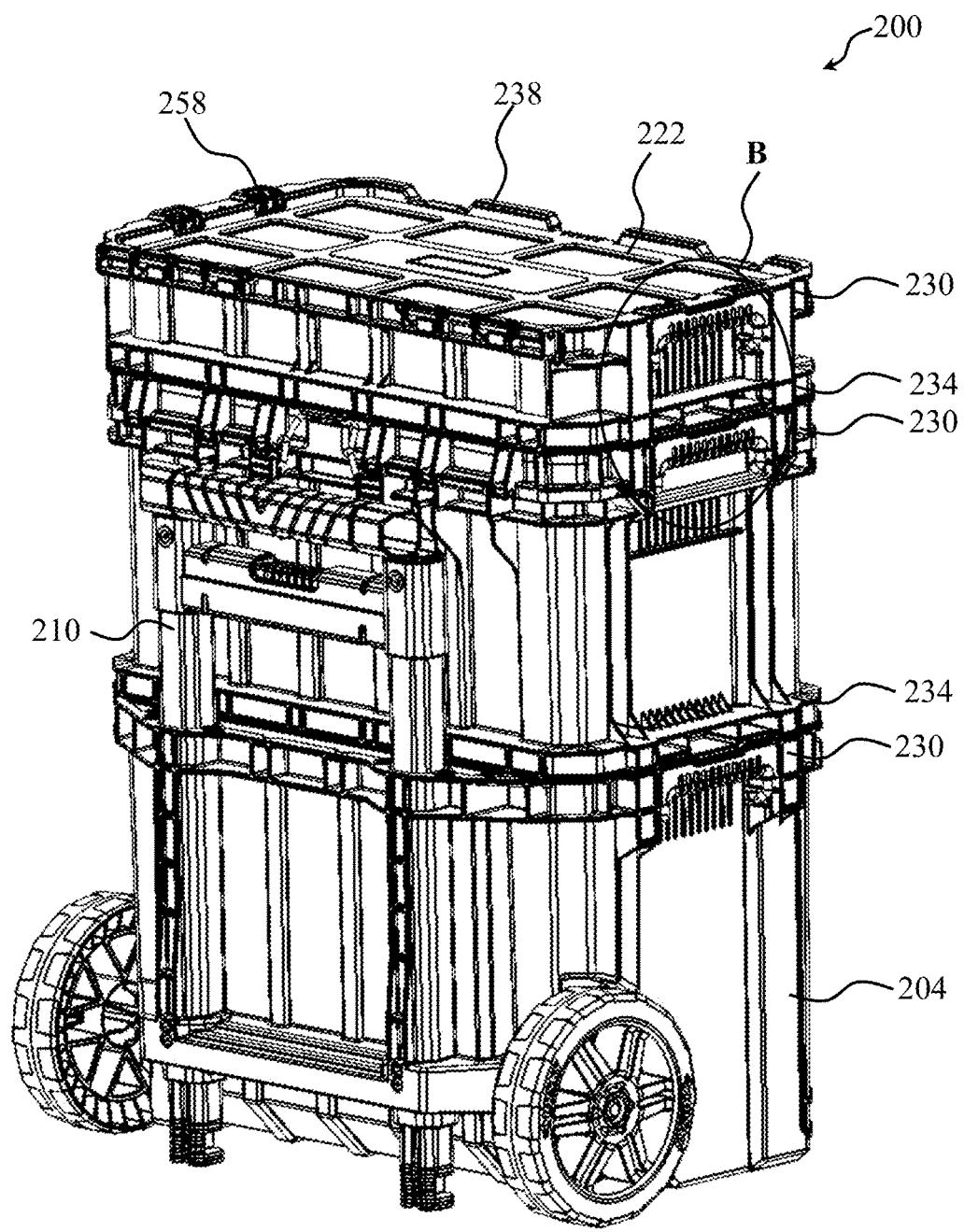
FIG. 12A is a top rear left side perspective view of FIG. 11A.
Figure 12B:
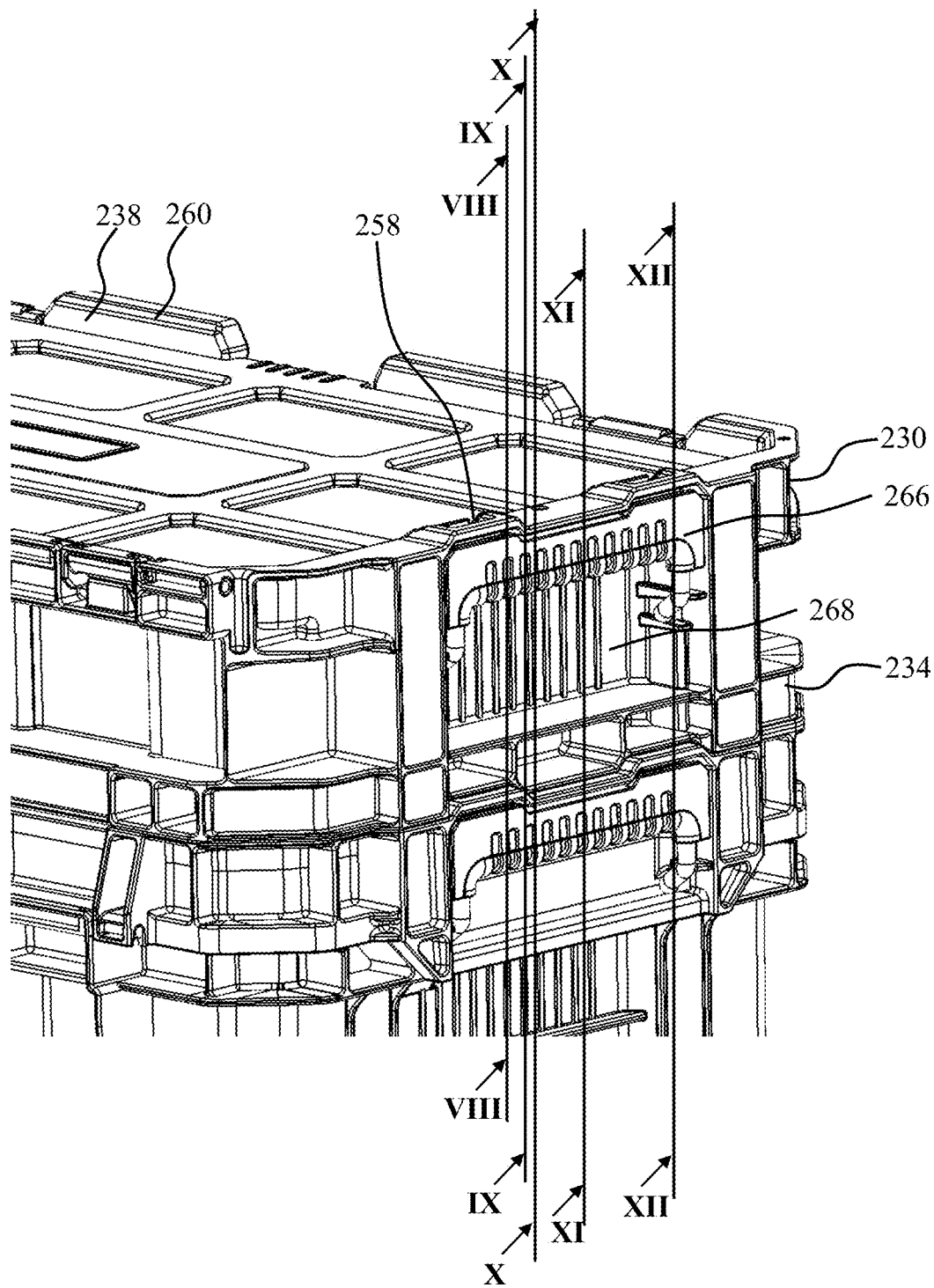
FIG. 12B is a close-up on the portion marked B in FIG. 12A, showing a locking arrangement of a second aspect of the disclosure, at its locked position.
Figure 13A:
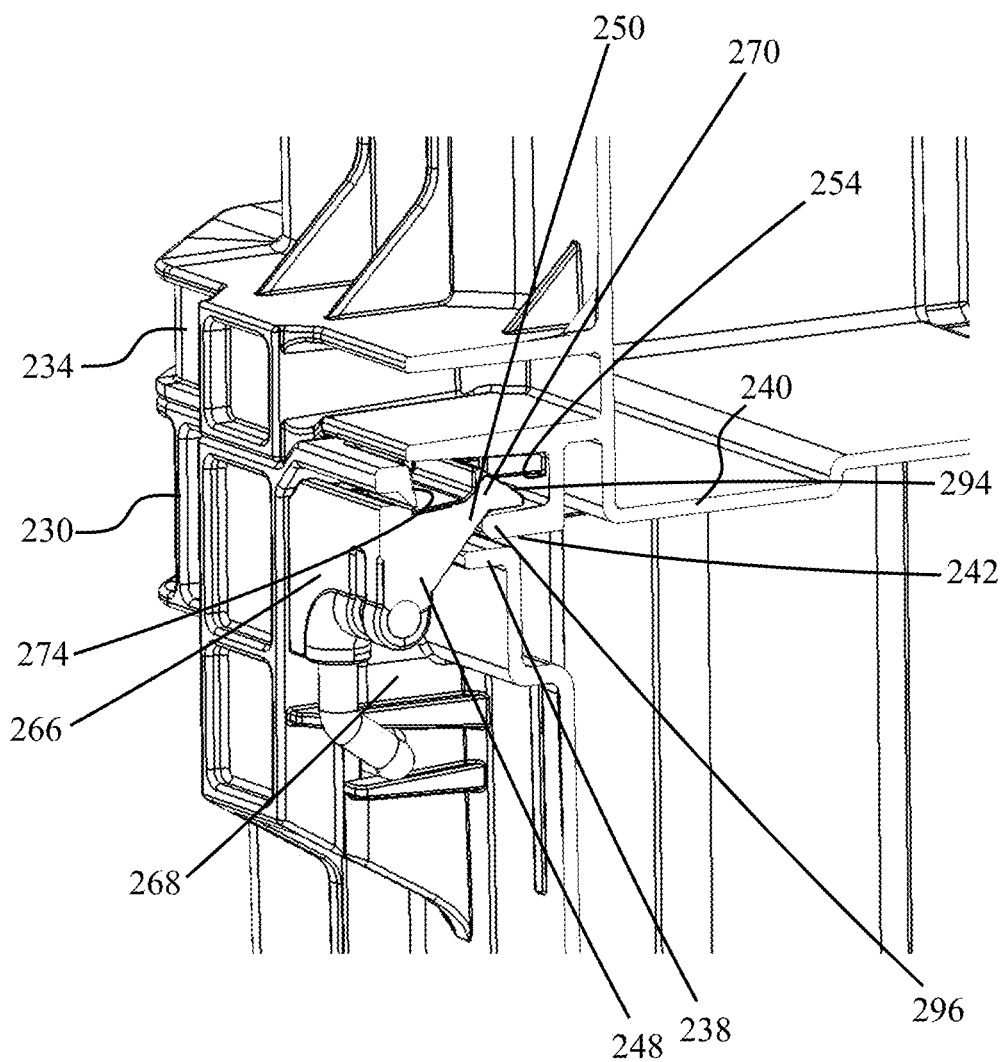
FIG. 13A is a partial section of the locking arrangement, along line VIII-VIII in FIG. 12B.
Figure 13B:
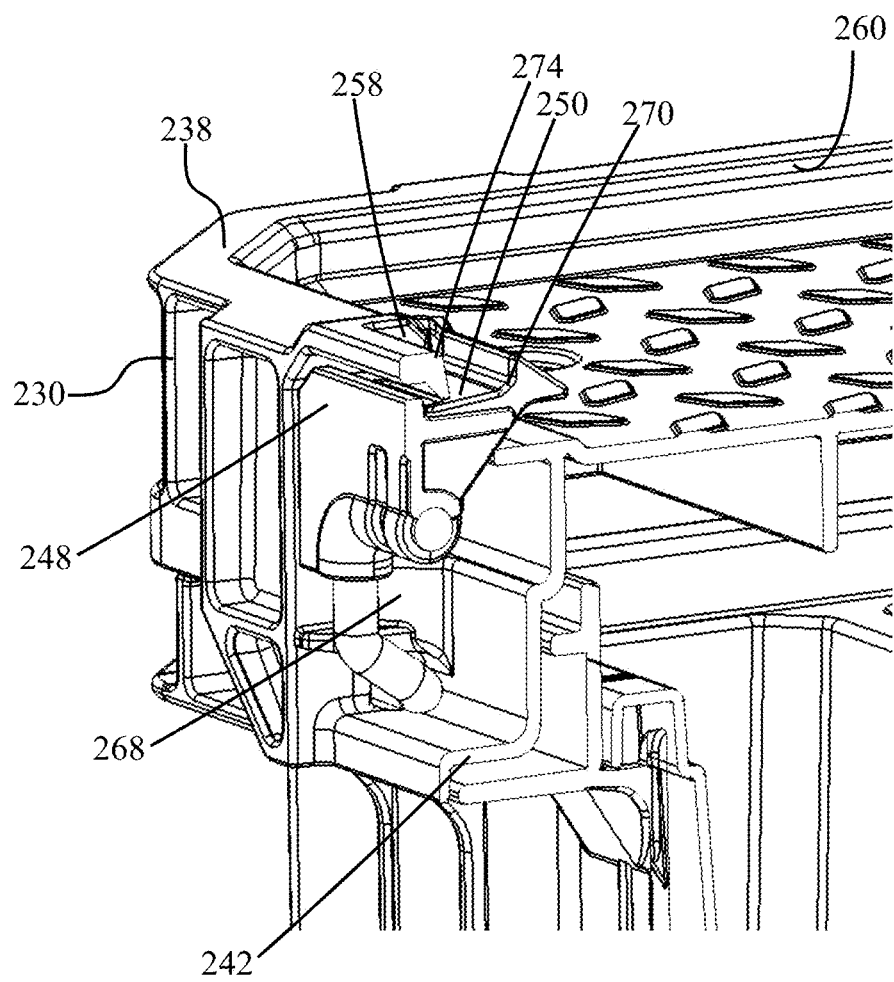
FIG. 13B is a partial section of the locking arrangement, along line IX-IX in FIG. 12B.
Figure 13C:
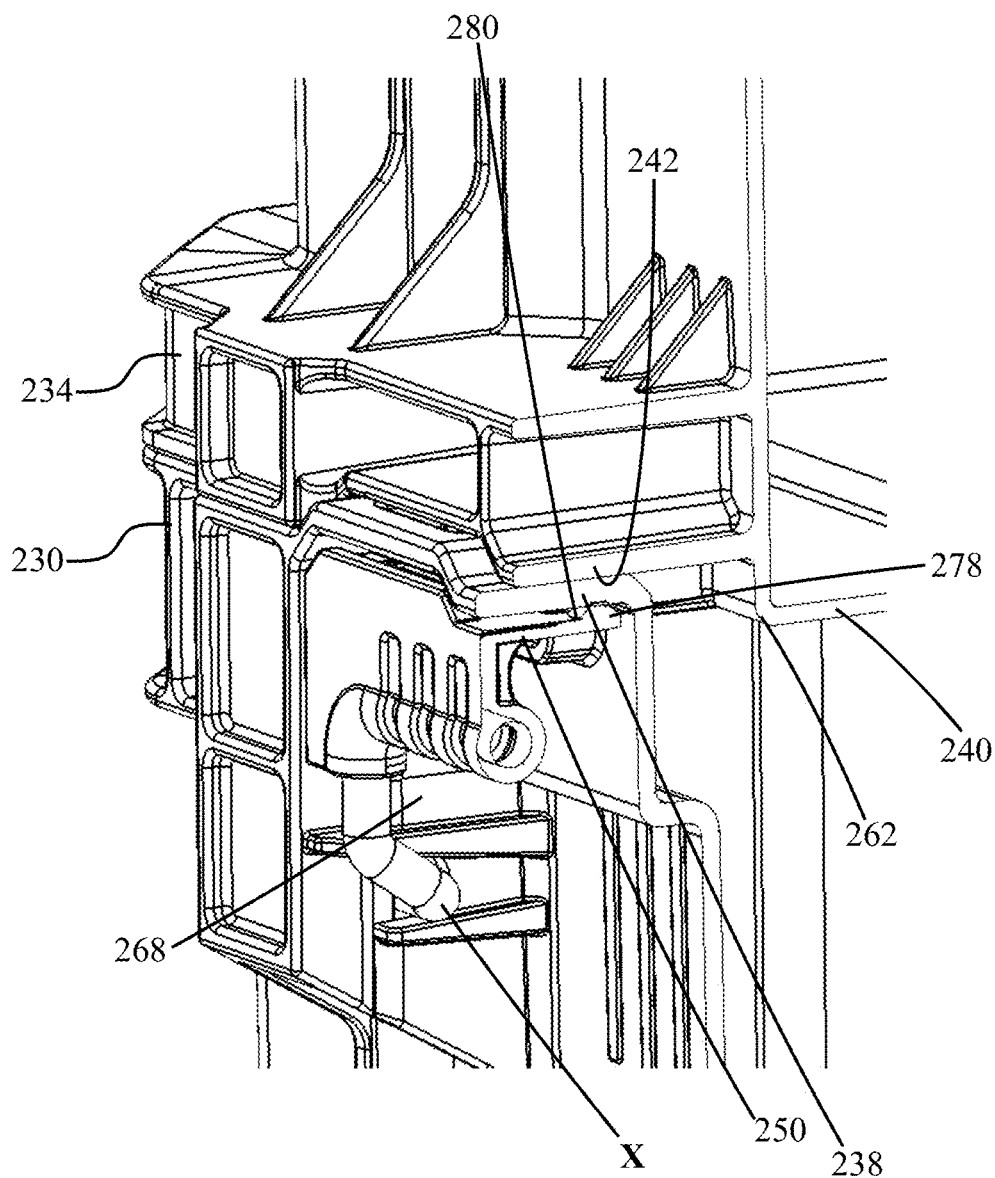
FIG. 13C is a partial section of the locking arrangement, along line X-X in FIG. 12B.
Figure 13D:
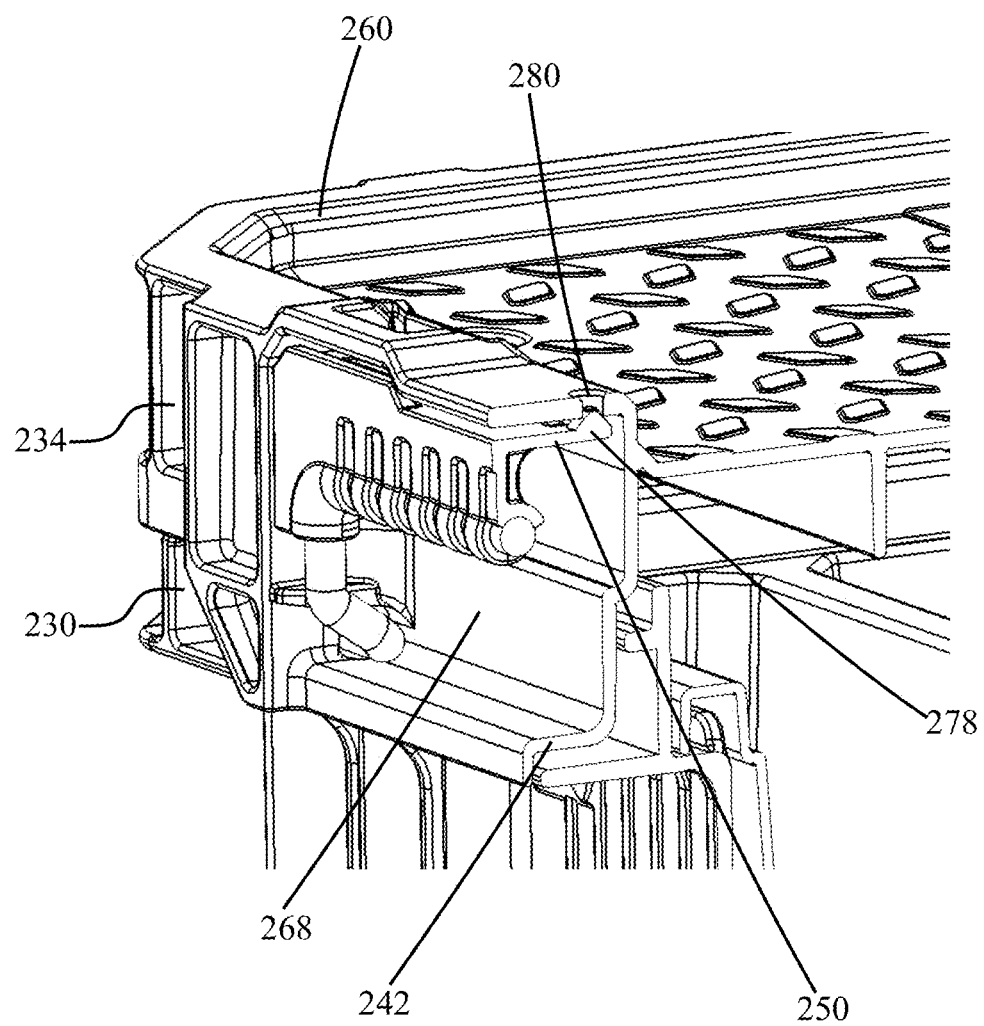
FIG. 13D is a partial section of the locking arrangement, along line XI-XI in FIG. 12B.
Figure 13E:
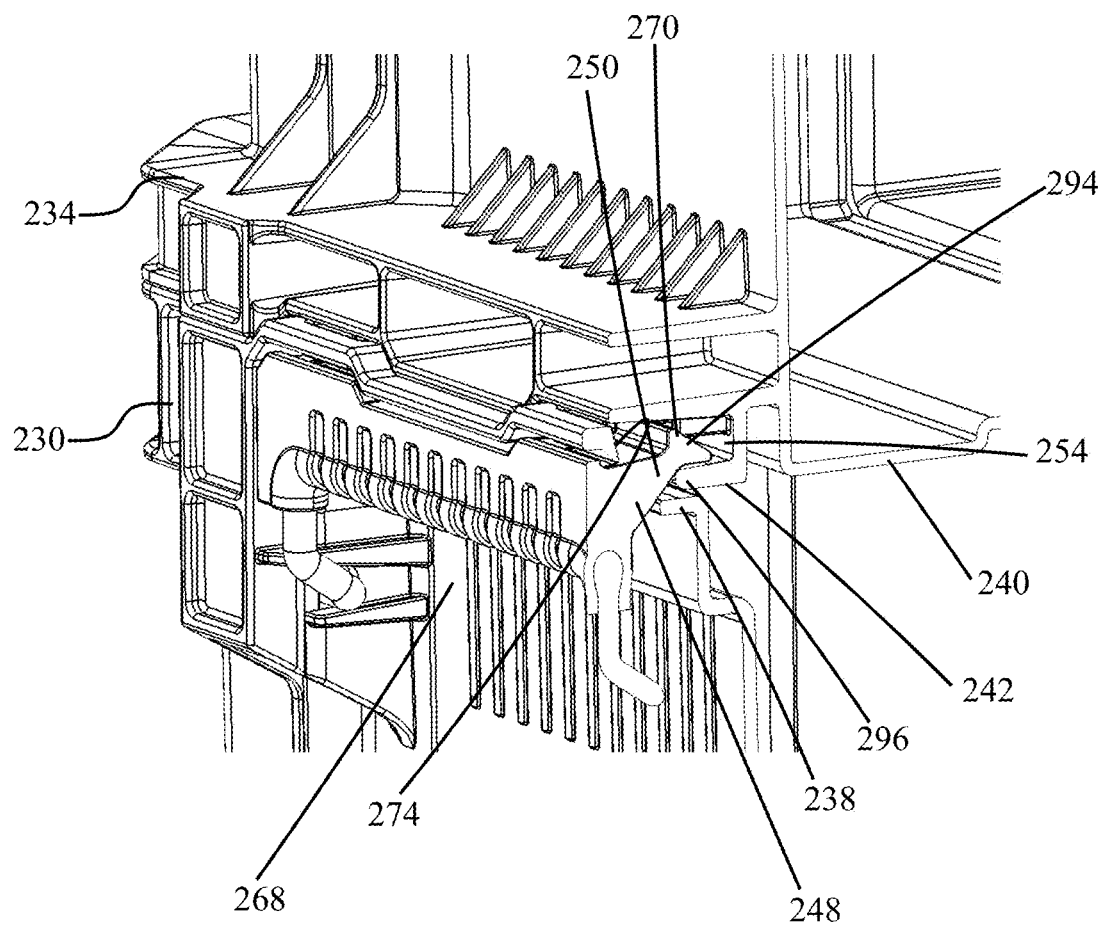
FIG. 13E is a partial section of the locking arrangement, along line XII-XII in FIG. 12B.
Figure 14:
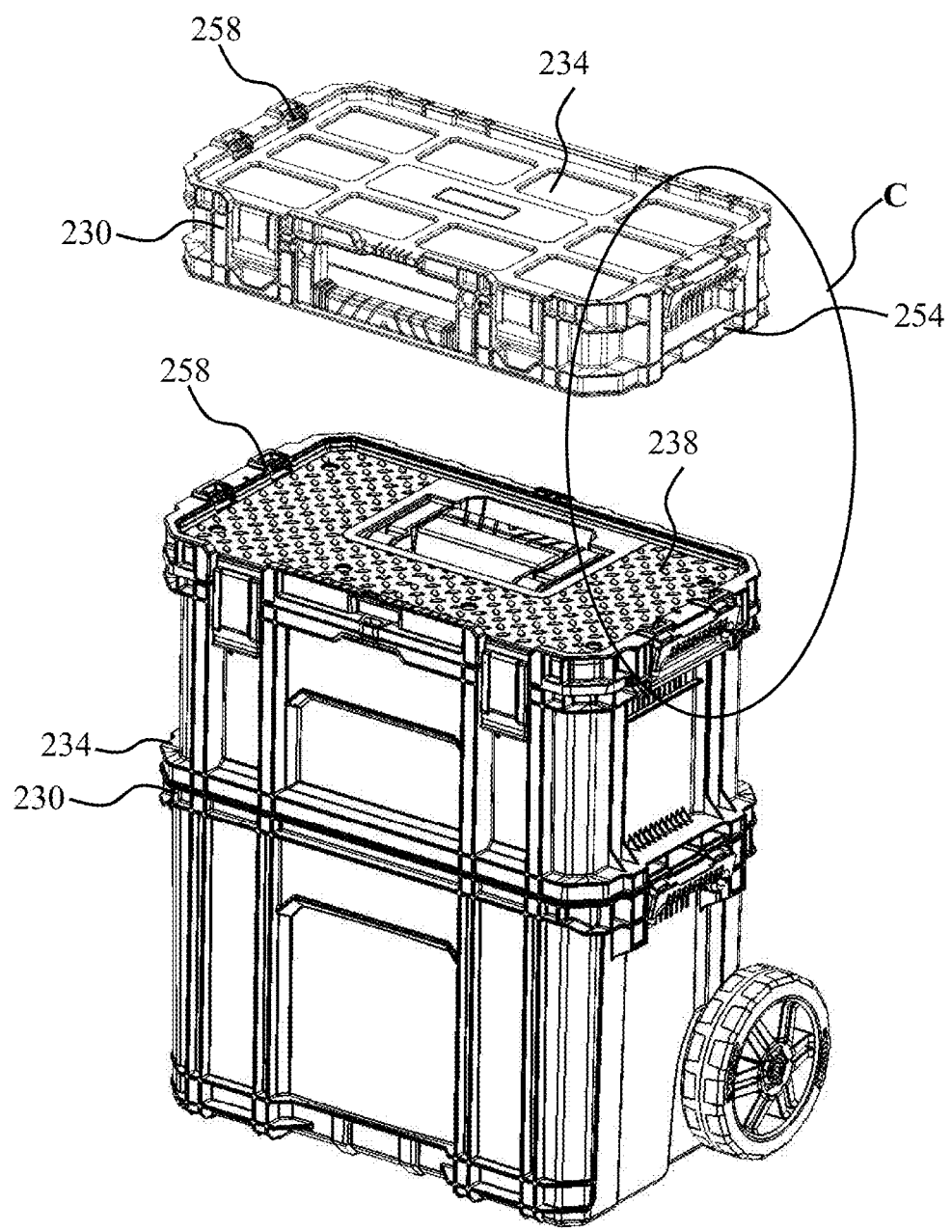
FIG. 14 is a partially exploded view of FIG. 11A, illustrating a top container separate from the container assembly.
Figure 15A:
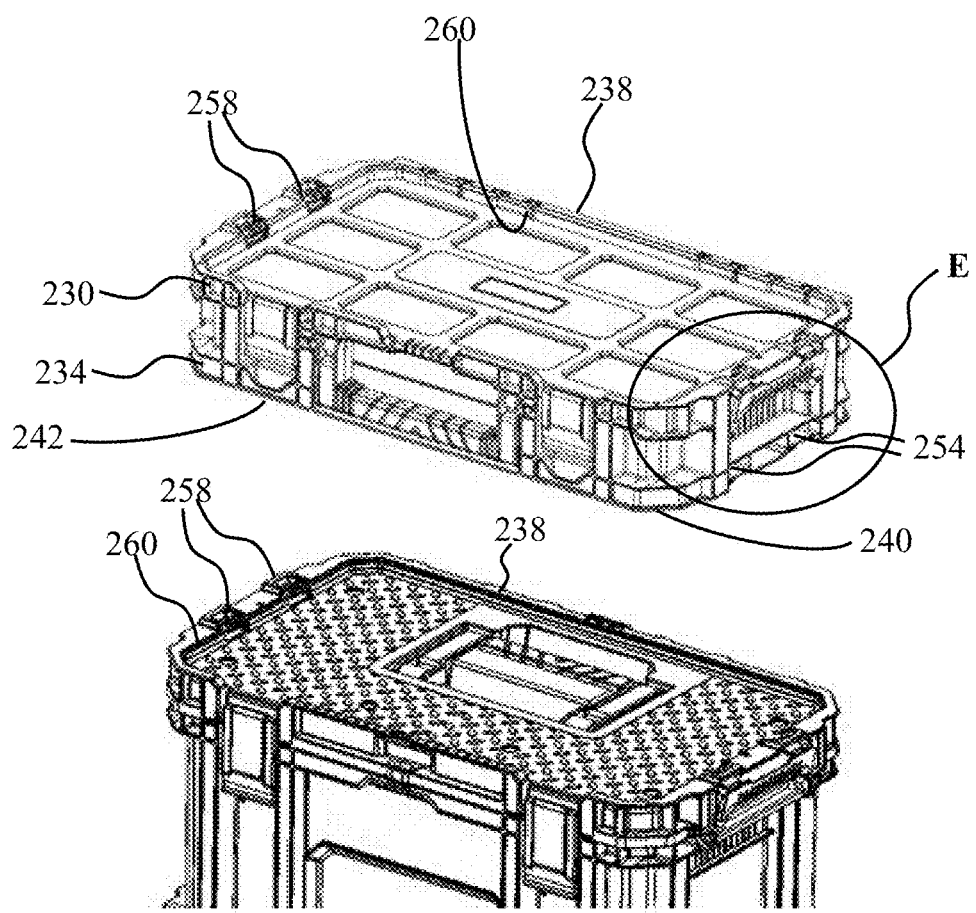
FIG. 15A is a close-up of the portion marked D in FIG. 14.
Figure 15B:
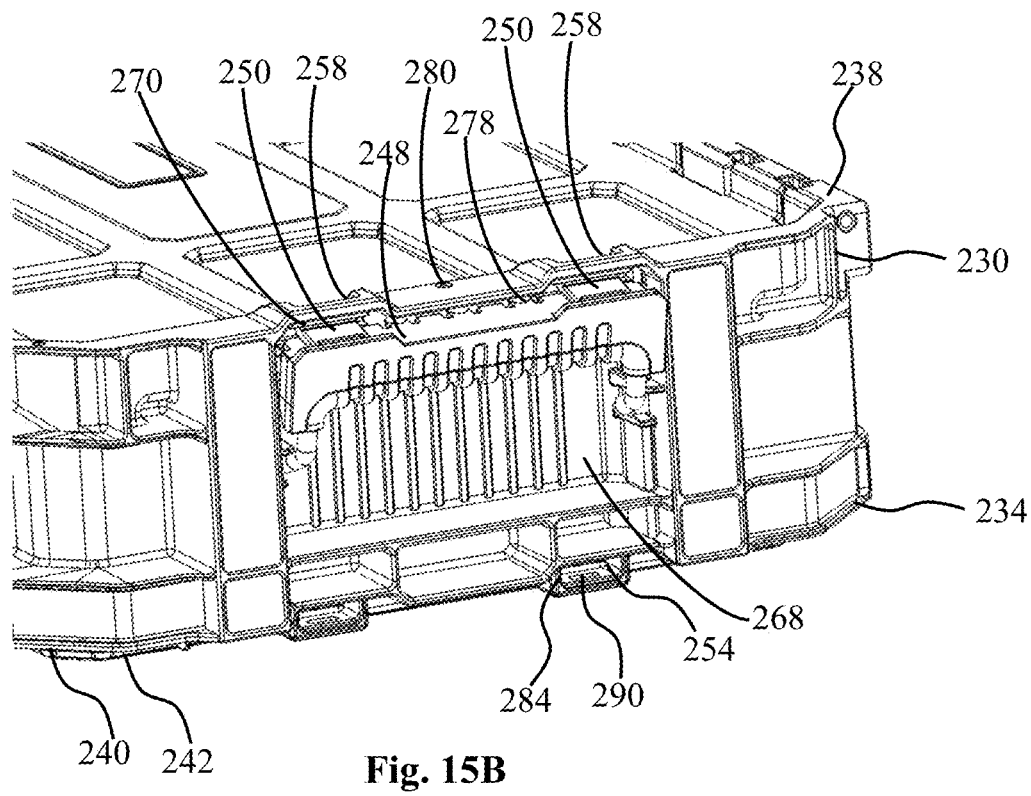
FIG. 15B is a close-up of the portion marked E in FIG. 15A.
Figure 15C:
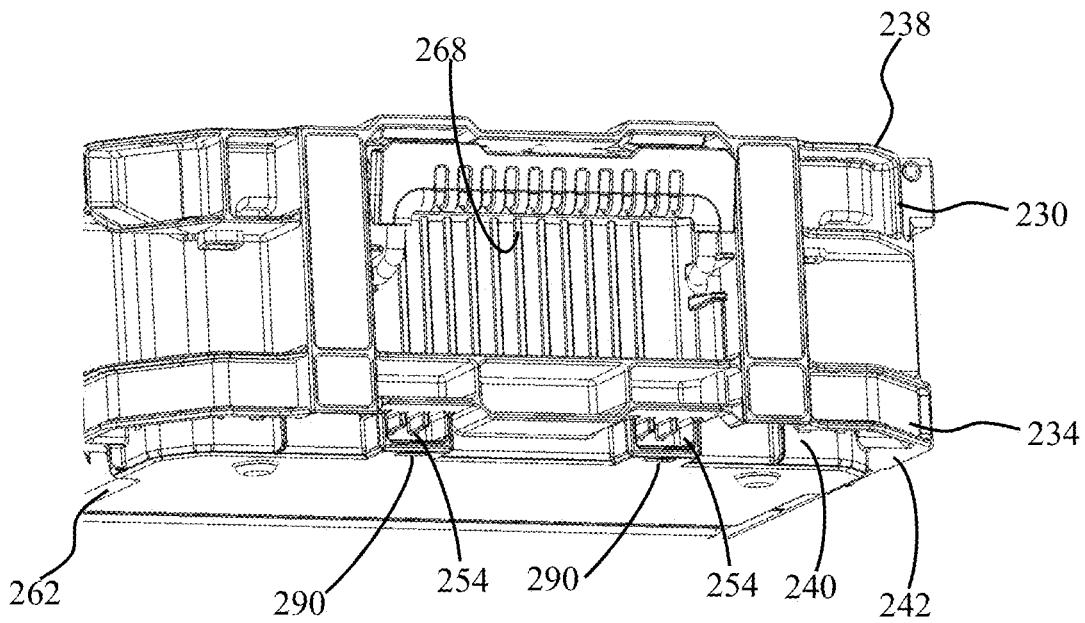
FIG. 15C is a bottom perspective view of FIG. 15B.
Figure 16A:
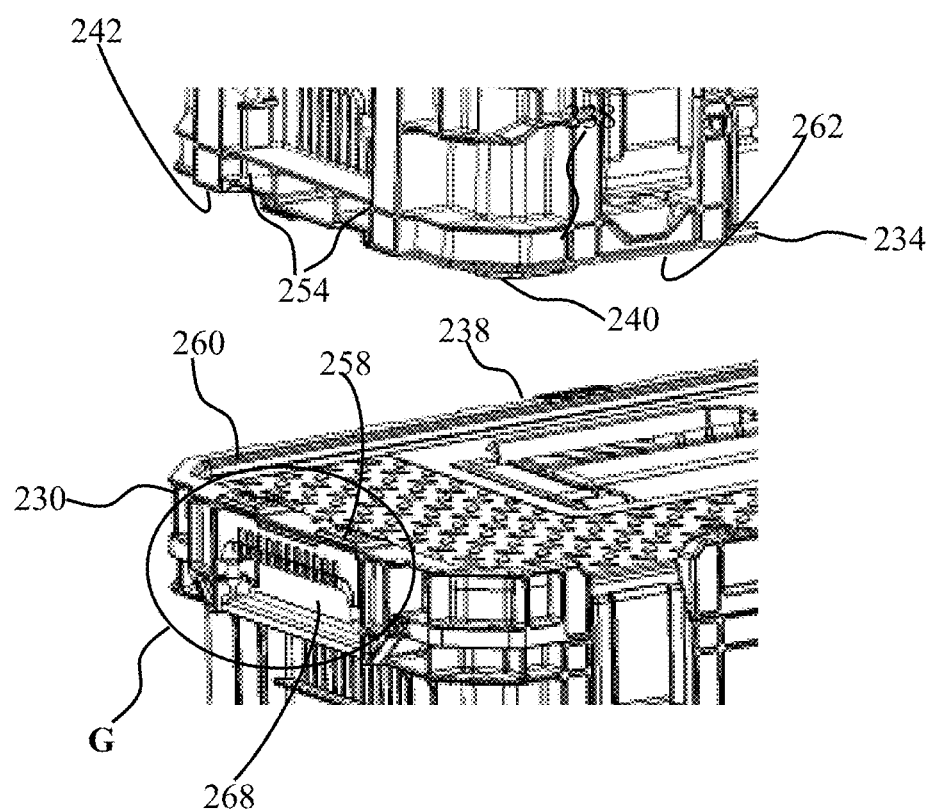
FIG. 16A is a close-up similar to FIG. 15A, however taken in direction of arrow F in FIG. 15A.
Figure 16B:
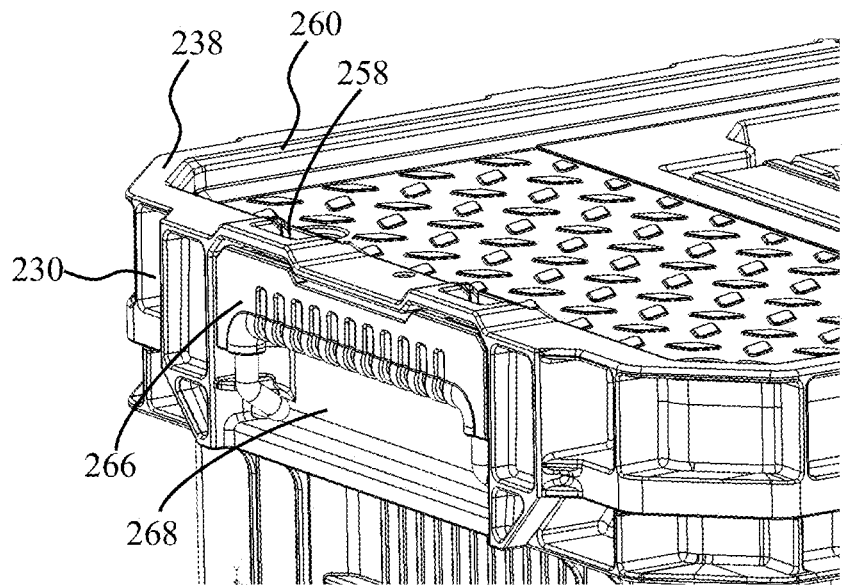
FIG. 16B is a close-up of the portion marked G in FIG. 16A.
Figure 16C:
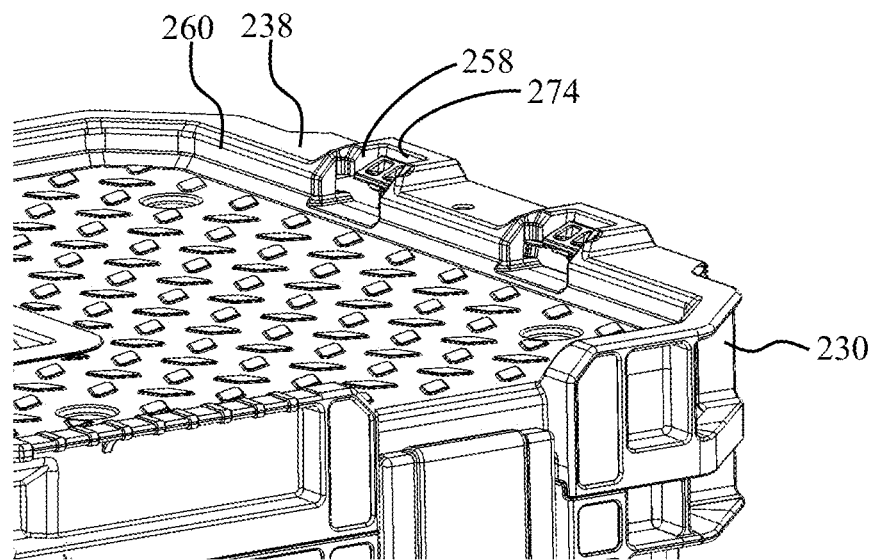
FIG. 16C is a close-up of the portion marked G in FIG. 16A.

With further reference to FIGS. 11D, 13A and 13E, it is seen that the fore top edge 294 of the locking latches 250 is chamfered and is configured such that it is engageable by a bottom edge 296 of the locking receptacle 254, whereby at the event that a second container is placed over a first container, when the locking member 248 of the first container is at the locked position (FIGS. 13A and 13B), positioning the second container over the first container entails spontaneous displacement of the locking member into the unlocked position (FIG. 11D) owing to the bottom edge 296 encountering said fore top edge 294 of the locking latches 250 and pivotally displacing it outwards, into the unlocked position.

The invention claimed is:

1. A containers assembly comprising at least one first container and at least one second container, detachably attachable to one another by a locking arrangement that comprises at least one locking member and a locking receptacle; at least one side wall of the first container comprises said at least one locking member pivotally secured at a top portion of the first container, and said locking receptacle is configured at a base portion of the second container, said locking member configured with at least one locking latch configured for locking engagement within said locking receptacle;

the locking member being pivotally displaceable between a locked position in which the at least one locking latch is radially engaged within the locking receptacle, such that the second container is lockingly articulated over the first container, and an unlocked position in which the locking member is outwardly pivoted and the at least one locking latch is disengaged from the locking receptacle such that the second container can be separated from the first container;

the first container being configured with a support rim constituting a nesting portion, and wherein at the locked position the at least one locking latch radially projects inwardly through said rim, the second container being configured at a bottom base portion thereof with a nestable portion in register with the support rim; and said locking receptacle is at the nestable portion and has an opening on a face of said nestable portion, wherein at the locked position said opening is disposed opposite a respective locking latch of the locking member, the locking member being configured to serve as a carrying handle, at either the locked position and the unlocked position, and further wherein the locking member is configured with a gripping portion, the gripping portion having a rim-facing surface being spaced apart, at both the locked position and unlocked position, from an opposing wall portion of the first container.

2. The containers assembly of claim 1, wherein the locking member is pivotally displaceable between the unlocked position and the locked position about an axis extending substantially parallel to a top base portion of the container.

3. The container assembly of claim 1, wherein the nesting portion at least partially circumferences a top base portion of the first container.

4. The container assembly of claim 3, wherein said support rim is configured with one or more latch passages, each slidingly accommodating a locking latch of the locking member.

5. The container assembly of claim 4, wherein one or both of the one or more locking member and the latch passages is configured with bulges for substantially reducing or eliminating slack of the locking member and friction arresting thereof; optionally wherein said one or more of the bulges protrude into a respective depression for snapingly arresting the locking member.

6. The container assembly of claim 4, wherein one or more locking latches of a locking arrangement displace through the latch passage between a locked position in which the locking latches project inwards from the support rim, configured to engage with a respective locking receptacle of the second container, and an unlocked position in which the locking latches are retracted in an outward direction, such that they substantially do not project inwards from the support rim, and are disengaged from the locking receptacle of the second container.

7. The container assembly of claim 4, characterized by one or more of the following features:
(a) one or more locking latch of the locking member extends below a top surface of the support rim, (b) when at an assembled position, a base portion of the second container is at least partially nested within a support rim of the first container, (c) the nestable portion is shaped and sized for at least partial nesting within boundaries of the support rim of the first container, and (d) wherein the locking member is pivotally restricted between the locked position and the unlocked position; pivotal restriction being facilitated by a restricting projection that is configured to prevent the locking latch from disengaging from the support rim.

8. The container assembly of claim 1, wherein
the locking member is configured with several locking latches.

9. The container assembly of claim 1, wherein in the event that a second container is placed over a first container, when the locking member of the first container is at the locked position, positioning the second container over the first container entails spontaneous displacement of the locking member into the unlocked position.

10. The container assembly of claim 1,
being configured as a portable container assembly.

11. The container assembly of claim 1, wherein the locking arrangement is configured with an arresting arrangement for arresting the locking member at least at the locked position, regardless if a second container is mounted thereover.

12. The container of claim 11, wherein the arresting arrangement being a snap-type arrangement, wherein one of the at least one locking latch and a top portion of the first container is configured with a projection and the other of the at least one locking latch and a top portion of the first container is configured with a recess, wherein the locking member is snapingly displaceable at least into the locked position.

13. The container assembly of claim 1, wherein a bottom most container of the assembly is fitted with a locomoting arrangement.

14. The container assembly of claim 1, comprising one or more bucket-like containers, one or more drawer containers configured with a drawer-housing container, one or more organizer containers configured with an organizer container, one or more sliding containers, one or more pivoting containers, and/or one or more parallel mechanism containers.

15. The container assembly of claim 1, being configured with a handle.

16. The container of claim 1, wherein the carrying handle is configured with a gripping portion, wherein the carrying handle can extend within a recess configured within a side wall of the first container, giving rise to a gripping space facilitating an individual to insert his fingers for gripping said gripping portion.

* * * * *